United States Patent
Park et al.

(10) Patent No.: US 10,338,954 B2
(45) Date of Patent: Jul. 2, 2019

(54) METHOD OF SWITCHING APPLICATION AND ELECTRONIC DEVICE THEREFOR

(71) Applicant: Samsung Electronics Co., Ltd., Gyeonggi-do (KR)

(72) Inventors: Hyewon Park, Gyeonggi-do (KR); Chihoon Lee, Seoul (KR); Hyoungjoon Jahng, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/614,165

(22) Filed: Jun. 5, 2017

(65) Prior Publication Data
US 2017/0351544 A1 Dec. 7, 2017

(30) Foreign Application Priority Data
Jun. 3, 2016 (KR) .................... 10-2016-0069515

(51) Int. Cl.
| | | |
|---|---|---|
| G06F 9/48 | (2006.01) | |
| G06F 3/0354 | (2013.01) | |
| G06F 3/041 | (2006.01) | |
| G06F 3/0481 | (2013.01) | |
| G06F 3/0488 | (2013.01) | |
| G06F 3/0482 | (2013.01) | |
| G06F 3/0484 | (2013.01) | |
| G06F 3/0486 | (2013.01) | |

(52) U.S. Cl.
CPC ............. *G06F 9/48* (2013.01); *G06F 3/03545* (2013.01); *G06F 3/041* (2013.01); *G06F 3/0481* (2013.01); *G06F 3/0482* (2013.01); *G06F 3/0486* (2013.01); *G06F 3/0488* (2013.01); *G06F 3/04817* (2013.01); *G06F 3/04842* (2013.01); *G06F 3/04845* (2013.01); *G06F 2203/04108* (2013.01); *G06F 2203/04807* (2013.01)

(58) Field of Classification Search
CPC ...... G06F 3/0482; G06F 3/0488; G06F 3/017; G06F 3/04883; G06F 3/044
See application file for complete search history.

(56) References Cited

U.S. PATENT DOCUMENTS

| | | |
|---|---|---|
| 2006/0230356 A1 | 10/2006 | Sauve et al. |
| 2009/0199127 A1 | 8/2009 | Sareen et al. |
| 2010/0058244 A1 | 3/2010 | Wang |

(Continued)

FOREIGN PATENT DOCUMENTS

| | | |
|---|---|---|
| KR | 20130107974 | 10/2013 |
| KR | 1020150044081 | 4/2015 |

OTHER PUBLICATIONS

International Search Report dated Sep. 20, 2017 issued in counterpart application No. PCT/KR2017/005721, 9 pages.

(Continued)

*Primary Examiner* — Gerald Johnson
(74) *Attorney, Agent, or Firm* — The Farrell Law Firm, P.C.

(57) ABSTRACT

An electronic device is provided. The electronic device includes a display and at least one processor that is configured to display an object corresponding to an application on the display, display an execution screen of the application in an area of the display when a hovering input is detected on the object corresponding to the application, and display the object corresponding to the application on the display when the hovering input is released.

18 Claims, 44 Drawing Sheets

(56) References Cited

U.S. PATENT DOCUMENTS

| | | |
|---|---|---|
| 2011/0202872 A1 | 8/2011 | Park |
| 2012/0287154 A1 | 11/2012 | Yook et al. |
| 2013/0254714 A1 | 9/2013 | Shin et al. |
| 2014/0075389 A1 | 3/2014 | Kim |
| 2014/0157201 A1 | 6/2014 | Ronkainen |
| 2014/0267094 A1* | 9/2014 | Hwang ................ G06F 3/0488 345/173 |
| 2015/0049035 A1* | 2/2015 | Kim ....................... G06F 3/013 345/173 |

OTHER PUBLICATIONS

European Search Report dated Mar. 11, 2019 issued in counterpart application No. 17807023.1-1216, 13 pages.

* cited by examiner

METHOD OF SWITCHING APPLICATION AND ELECTRONIC DEVICE THEREFOR

PRIORITY

This application claims priority under 35 U.S.C. § 119(a) to Korean Patent Application Ser. No. 10-2016-0069515, which was filed in the Korean Intellectual Property Office on Jun. 3, 2016, the entire content of which is incorporated herein by reference.

BACKGROUND

1. Field of the Disclosure

The present disclosure relates, generally, to an apparatus that includes multiple applications, and more particularly, to an apparatus and method for switching between applications in an electronic device.

2. Description of the Related Art

Electronic devices provide various multimedia services, such as a voice call service, a message service, a broadcasting service, a wireless Internet service, a camera service, and a music play service.

The electronic device may also provide a service through various applications installed in the electronic device. For example, the application includes at least one of a music application for playing music contents, a call application for a voice call service, and a camera application for a camera service.

SUMMARY

An electronic device may execute an application selected by a user among one or more applications installed in the electronic device and provide a service corresponding to the selected application to the user.

When a plurality of applications are installed in the electronic device, a user may be inconvenienced in selecting and executing an application corresponding to a service which the user needs. For example, the electronic device may display an icon (or an image) corresponding to each application installed in the electronic device on a home screen. Accordingly, when the user of the electronic device switches from an application currently being executed in the electronic device, a user has to return to the home screen from an execution screen of the application and then select an icon of another application that the user wishes to execute.

The present disclosure has been made to address at least the disadvantages described above and to provide at least the advantages described below.

In accordance with an aspect of the present disclosure, an electronic device is provided. The electronic device includes a display and at least one processor that is configured to display an object corresponding to an application on the display, display an execution screen of the application in an area of the display when a hovering input is detected on the object corresponding to the application, and display the object corresponding to the application on the display when the hovering input is released.

In accordance with an aspect of the present disclosure, there is provided a method of operating an electronic device. The method includes displaying an object corresponding to an application on a display of the electronic device, when a hovering input is detected on the object corresponding to the application, displaying an execution screen of the application in an area of the display, and when the hovering input is released, displaying the object corresponding to the application on the display.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION

Figure 1:
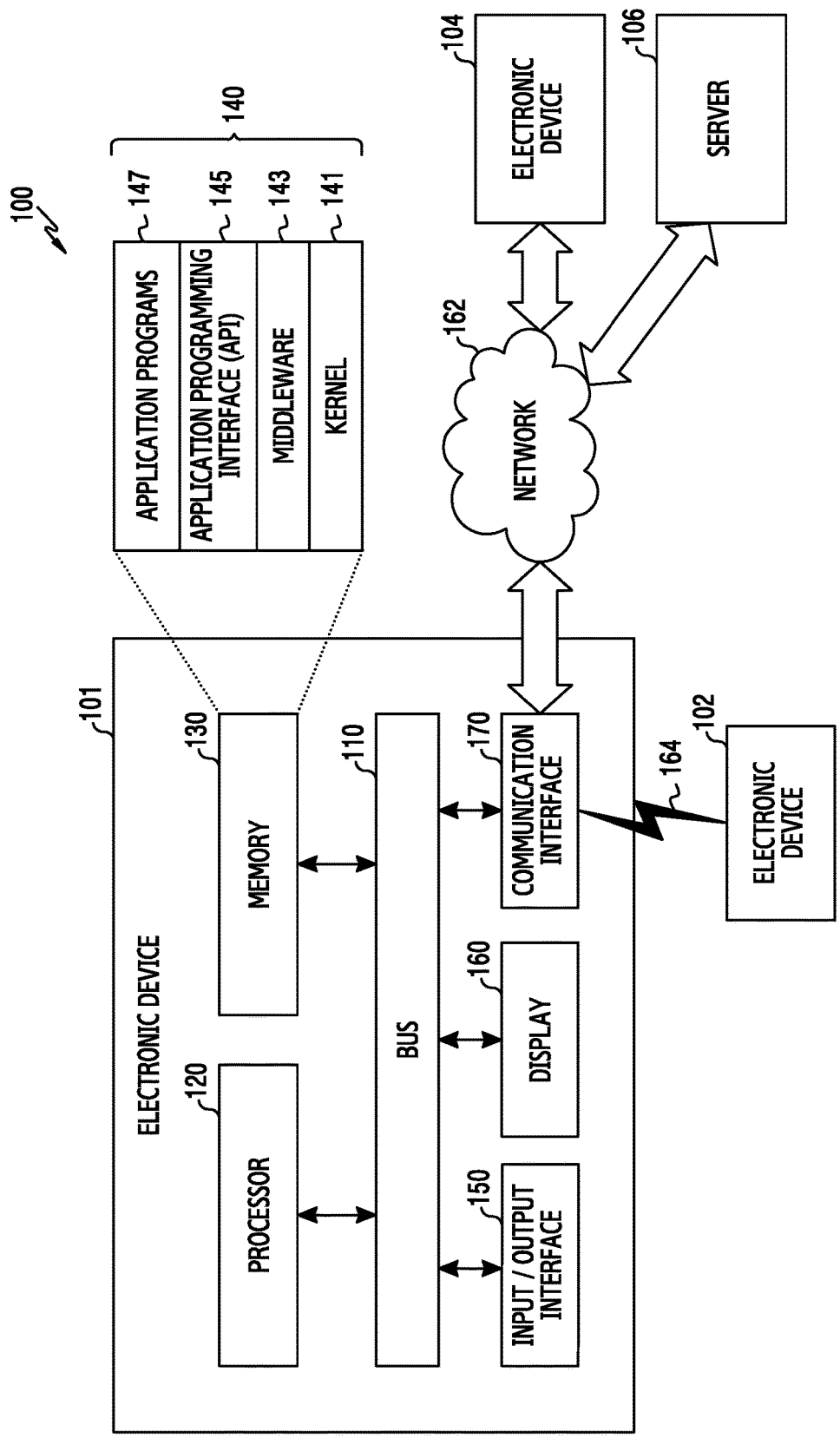
FIG. 1 is a diagram of an electronic device within a network environment, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B. The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an Application-Specific Integrated Circuit (ASIC) chip, a Field-Programmable Gate Arrays (FPGA), and a programmable-logic device for performing operations which has been known or are to be developed hereinafter.

An electronic device according to the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of Things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device (foldable device). Further, the electronic device is not limited to the aforementioned devices, and may include an electronic device according to the development of new technology.

Hereinafter, an electronic device will be described with reference to the accompanying drawings. In the present disclosure, the term "user" may indicate a person using an electronic device or a device (e.g., an artificial intelligence electronic device) using an electronic device.

In the following description, an electronic device may switch an application executed in the electronic device based on a hovering input (or a hovering touch). For example, the hovering input may include an input of a proximity touch type in which a user's input can be detected in a state where a user's finger or an electronic pen is close to a touch screen without contact.

Hereinafter, a touch movement may be defined as a type of an input in which a touch coordinate moves in a state where a touch input is maintained. A hovering movement may be defined as a type of an input in which a coordinate by a hovering input moves in a state where the hovering input is maintained.

FIG. 1 is a diagram of an electronic device 101 within a network environment 100, according to an embodiment of the present disclosure.

Referring to FIG. 1, the electronic device 101 includes a bus 110, a processor 120 (e.g., including processing circuitry), a memory 130, an input/output interface 150 (e.g., including input/output circuitry), a display 160 (e.g., including display circuitry), and a communication interface 170 (e.g., including communication circuitry). The electronic device 101 may omit at least one of the elements, or may further include other elements.

The bus 110 may include a circuit that interconnects the elements 120 to 170 and delivers communication (a control message and/or data) between the elements 120 to 170.

The processor 120 may include one or more of a central processing units (CPU), an application processor (AP), a communication processor (CP), and an image signal processor (ISP). The processor 120 may carry out operations or data processing relating to the control and/or communication of at least one other element of the electronic device 101.

The processor 120 may control to reduce and display information on an application in areas of the display 160. When a selection input of a menu for reducing the application is detected, the processor 120 may determine that an event for reducing and displaying information on the application is generated. The processor 120 may control the display 160 to display an object corresponding to the application in areas of the display 160 in response to the generation of the event. The processor 120 may determine to reduce and display information on the application of which an execution screen is displayed on the display 160 at a time point when the event is generated. The processor 120 may control the display 160 to reduce and display information on the selected application before or after the event for reducing and displaying the information on the application is generated. When a gesture input for reducing the application is detected, the processor 120 may determine that an event for reducing and displaying information on the application is generated. When the gesture input for reducing the application is detected in a reference area (e.g., an upper edge) of an application execution screen, the processor 120 may determine that an event for reducing and displaying information on the corresponding application is generated.

When the generation of the event for reducing and displaying the information on the application is detected, the processor 120 may control the display 160 to display an icon of the application in areas of the display 160. The processor 120 may set an execution screen of the application executed in the electronic device 101, which is reduced to be a reference size (e.g., an icon size) as the icon of the application. The processor 120 may control the display 160 to display an execution screen of a game application or a video reproduction screen of a video reproduction application executed in the electronic device 101, which is reduced to a reference size. The processor 120 may maintain the execution of the application through the reduced application execution screen. The processor 120 may control the display 160 to display a predefined icon of an application stored in the memory 130 in at least some areas of the display 160. The processor 120 may set a captured image of the application execution screen as the icon of the corresponding application. The processor 120 may capture the application execution screen based on a predefined capture position (e.g., a center position of the application execution screen). The processor 120 may capture the application execution screen by setting a position where a hovering input is released as the capture position.

The processor 120 may switch the application based on a hovering input corresponding to the application. The switching of the application may indicate a series of actions for switching the application for displaying an execution screen on the display 160. Specifically, when a hovering input is detected on an object (e.g., application icon) corresponding to application information reduced and displayed in at least some areas of the display 160, the processor 120 may control the display 160 to display an application execution screen corresponding to the object in all or at least some areas of the display 160. When the hovering input for the application execution screen is released, the processor 120 may control the display 160 to display the object corresponding to application information in at least some areas of the display 160.

The processor 120 may control the execution of the application based on application switching information. When the information on the application is reduced and displayed, the processor 120 may pause the execution of the application. When the application, which has been reduced and displayed based on the hovering input, is enlarged and displayed, the processor 120 may re-execute the application. When the execution of the application is paused, the processor 120 may maintain a state where an execution file of the application is loaded to the memory 130.

The memory 130 may include a volatile and/or non-volatile memory. The memory 130 may store instructions or data relevant to at least one other element of the electronic device 101. The memory 130 may store software and/or a program 140. The program 140 may include a kernel 141, middleware 143, an application programming interface (API) 145, and/or application programs (or applications) 147. At least a part of the kernel 141, the middleware 143, or the API 145 may be referred to as an operating system (OS).

The input/output interface 150 may function as an interface that can forward instructions or data, which are input from a user or an external device, to the other element(s) of the electronic device 101.

The display 160 may include a liquid crystal display (LCD), a light emitting diode (LED) display, an organic light emitting diode (OLED) display, a micro electro mechanical system (MEMS) display, or an electronic paper display. The display 160 may display various types of contents (e.g., text, images, videos, icons, and/or symbols) to a user. The display 160 may include a touch panel (touch screen) and may receive a touch input, a gesture input, a proximity input, or a hovering input using an electronic pen or a user's body part.

The communication interface 170 may configure communication between the electronic device 101 and a first external electronic device 102, a second external electronic device 104, or a server 106. The communication interface 170 may be connected to a network 162 through wireless or wired communication to communicate with the second external electronic device 104 or the server 106.

The wireless communication may include a cellular communication that uses at least one of long-term-evolution (LTE), LTE-advance (LTE-A), code division multiple access (CDMA), wideband CDMA (WCDMA), universal mobile telecommunications system (UMTS), wireless broadband (WiBro), global system for mobile communications (GSM), or the like. The wireless communication may include at least one of wireless-fidelity (Wi-Fi), light-fidelity (Li-Fi), bluetooth (BT), BT low energy (BLE), ZigBee, near field communication (NFC), magnetic secure transmission, radio frequency (RF), and body area network (BAN). The wired communication may include a global navigation satellite system (GNSS). The GNSS may be a global positioning system (GPS), a global navigation satellite system (Glonass), Beidou navigation satellite system (Beidou), or Galileo (the European global satellite-based navigation system). The term "GPS" may be interchangeable with the term "GNSS". The wired communication may include at least one of a universal serial bus (USB), a high definition multimedia interface (HDMI), recommended standard 232 (RS-232), and a plain old telephone service (POTS). The network 162 may include a telecommunications network, e.g., at least one of a computer network (e.g., a local area network (LAN) or a wide-area network (WAN)), the Internet, and a telephone network.

Each of the first and second external electronic devices 102 and 104 may be of the same or a different type from the electronic device 101. All or some of the operations executed in the electronic device 101 may be executed in the electronic devices 102 and 104 or the server 106.

Figure 2:
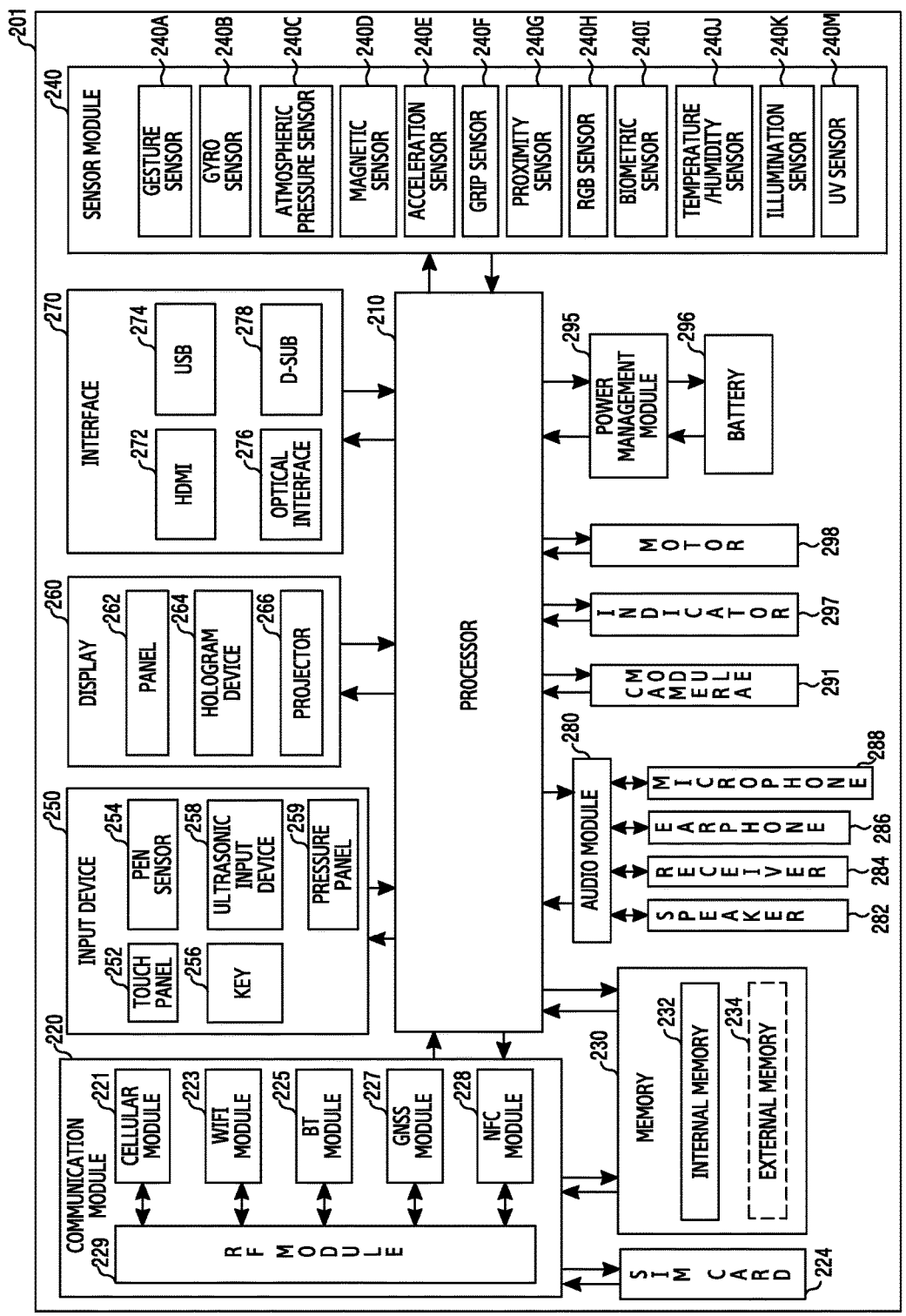
FIG. 2 is a diagram of an electronic device, according to an embodiment of the present disclosure.

FIG. 2 is a diagram of an electronic device 201, according to an embodiment of the present disclosure. The electronic device 201 may include the whole or part of the electronic device 101 illustrated in FIG. 1. The electronic device 201 may include at least one processor 210 (e.g., an AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected thereto and may perform various data processing and operations by driving an operating system or an application program. The processor 210 may be embodied as a system on chip (SoC). The processor 210 may further include a graphic processing unit (GPU) and/or an image signal processor. The processor 210 may also include at least some (e.g., a cellular module 221) of the elements illustrated in FIG. 2. The processor 210 may load, in a volatile memory, instructions or data received from at least one of the other elements (e.g., a non-volatile memory), process the loaded instructions or data, and store the result data in the non-volatile memory.

The processor 210 may switch an application based on a hovering input for application information reduced and displayed in areas of the display 260. When a hovering input on a display area of an object corresponding to the application is detected through a pen sensor 254, the processor 210 may control the display 260 to display an execution screen of the application in areas of the display 260. When a hovering input is not detected through the pen sensor 254 in a state where the execution screen of the application is displayed, the processor 210 may reduce the execution screen of the application to be an object corresponding to the application and display the reduced execution screen on the display 260.

The communication module 220 may have a configuration similar to that of the communication interface 170 of FIG. 1. The communication module 220 may include a cellular module 221, a Wi-Fi module 223, a BT module 225, a GNSS module 227, an NFC module 228, and an RF module 229.

The cellular module 221 may provide a voice call, a video call, a text message service, an Internet service, or the like through a communication network. The cellular module 221 may identify and authenticate the electronic device 201 within a communication network using the SIM 224 (e.g., a SIM card). The cellular module 221 may perform at least some of the functions that the processor 210 may provide. The cellular module 221 may include a CP.

At least some of the cellular module 221, the Wi-Fi module 223, the BT module 225, the GNSS module 227, and the NFC module 228 may be included in one integrated chip (IC) or IC package.

The RF module 229 may transmit/receive a communication signal (e.g., an RF signal). The RF module 229 may include a transceiver, a power amp module (PAM), a frequency filter, a low noise amplifier (LNA), an antenna, or the like. At least one of the cellular module 221, the Wi-Fi module 223, the BT module 225, the GPS module 227, and the NFC module 228 may transmit/receive an RF signal through a separate RF module. The SIM 224 may be an embedded SIM, and may contain unique identification information (e.g., an integrated circuit card identifier (ICCID)) or subscriber information (e.g., international mobile subscriber identity (IMSI)).

The memory 230 may include an internal memory 232 or an external memory 234. The internal memory 232 may include at least one of a volatile memory (e.g., a dynamic read access memory (DRAM), a static RAM (SRAM), a synchronous dynamic RAM (SDRAM), or the like) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory, a hard disc drive, or a solid state drive (SSD)). The external memory 234 may include a flash drive, e.g., a compact flash (CF), a secure digital (SD), a micro-SD, a mini-SD, an eXtreme digital (xD), a multi-media card (MMC), a memory stick, and the like. The external memory 234 may be functionally and/or physically connected to the electronic device 201 through various interfaces.

The sensor module 240 may measure a physical quantity or detect the operating state of the electronic device 201 and may convert the measured or detected information into an electrical signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. The electronic device 201 may further include a processor configured to control the sensor module 240 as a part of or separately from the AP 210, and may control the sensor module 240 while the AP 210 is in a sleep state.

The input device 250 may include a touch panel 252, a (digital) pen sensor 254, a key 256, an ultrasonic input device 258, or a pressure panel 259. The touch panel 252 may use at least one of a capacitive type, a resistive type, an infrared type, and an ultrasonic type. Furthermore, the touch panel 252 may further include a control circuit. The touch panel 25A may further include a tactile layer and may provide a tactile reaction (touch coordinate) to the user.

The (digital) pen sensor 254 may include a recognition sheet that is a part of, or separate from, the touch panel. The pen sensor 254 is an electro-magnetic resonance (EMR) type touch panel and may include an electromagnetic induction coil sensor and an electronic signal processor that sequentially provides an alternating current signal to each loop coil of the electromagnetic induction coil sensor. When the pen sensor 254 is close to an electronic pen having a resonant circuit therein, a magnetic field transmitted from a loop coil close to the electronic pen may generate a current based on mutual electromagnetic induction in the resonant circuit of the electronic pen. The electronic pen may generate an induced magnetic field from the coil included in the resonant circuit based on the current generated in the pen sensor 254. The pen sensor 254 may detect the induced magnetic field generated in the electronic pen in the loop coil in a signal reception state, and thus detect a hovering input of the electronic pen.

The key 256 may include a physical button, an optical key, or a keypad. The ultrasonic input device 258 may detect ultrasonic waves, which are generated by an input tool, through a microphone 288 to identify data corresponding to the detected ultrasonic waves. The pressure panel 259 may provide a tactile reaction (pressure coordinate and pressure intensity) to the user.

The display 260 may include a panel 262, a hologram device 264, a projector 266, and/or a control circuit for controlling them. The panel 262 may be flexible, transparent, or wearable. The panel 262, together with the touch panel 252, may be configured as one or more modules. The hologram device 264 may show a three dimensional image in the air by using an interference of light. The projector 266 may display an image by projecting light onto a screen. The screen may be located in the interior of, or on the exterior of, the electronic device 201. The interface 270 may include an HDMI 272, a USB 274, an optical interface 276, or a D-subminiature (D-sub) 278. The interface 270 may be included in the communication interface 170 illustrated in FIG. 1. Additionally or alternatively, the interface 270 may include a mobile high-definition link (MHL) interface, a secure digital (SD) card/multi-media card (MMC) interface, or an infrared data association (IrDA) standard interface.

The audio module 280 may convert a sound into an electrical signal, and vice versa. At least some elements of the audio module 280 may be included in the input/output interface 145 illustrated in FIG. 1. The audio module 280 may process sound information that is input or output through a speaker 282, a receiver 284, earphones 286, the microphone 288, and the like.

The camera module 291 is a device that can photograph a still image and a moving image. The camera module 291 may include one or more image sensors (e.g., a front sensor or a rear sensor), a lens, an image signal processor (ISP), or a flash (e.g., an LED or xenon lamp).

The power management module 295 may manage the power of the electronic device 201. The power management module 295 may include a power management integrated circuit (PMIC), a charger IC, or a battery gauge. The PMIC may use a wired and/or wireless charging method. Examples of the wireless charging method may include a magnetic resonance method, a magnetic induction method, an electromagnetic wave method, and the like. Additional circuits (e.g., a coil loop, a resonance circuit, a rectifier, and the like) for wireless charging may be further included. The battery gauge may measure the residual amount of the battery 296 and a voltage, current, or temperature while charging. The battery 296 may include a rechargeable battery and/or a solar battery.

The indicator 297 may indicate a particular state (e.g., a booting state, a message state, a charging state, and the like) of the electronic device 201 or a part (e.g., the processor 210) thereof.

The motor 298 may convert an electrical signal into a mechanical vibration and may generate a vibration, a haptic effect, or the like. The electronic device 201 may include a mobile TV support device that can process media data according to a standard, such as digital multimedia broadcasting (DMB), digital video broadcasting (DVB), mediaFlo™, and the like.

Each of the above-described component elements of hardware may be configured with one or more components, and the names of the corresponding component elements may vary based on the type of electronic device. The electronic device 201 may omit some elements or may further include additional elements, or some of the elements of the electronic device may be combined with each other to configure one entity, in which case the electronic device may identically perform the functions of the corresponding elements prior to the combination.

When the electronic device 201 includes the capacitive type touch panel 252, the electronic device 201 may detect a hovering input of the input means (e.g., a finger) by increasing sensitivity of touch recognition of the touch panel 252.

Figure 3:
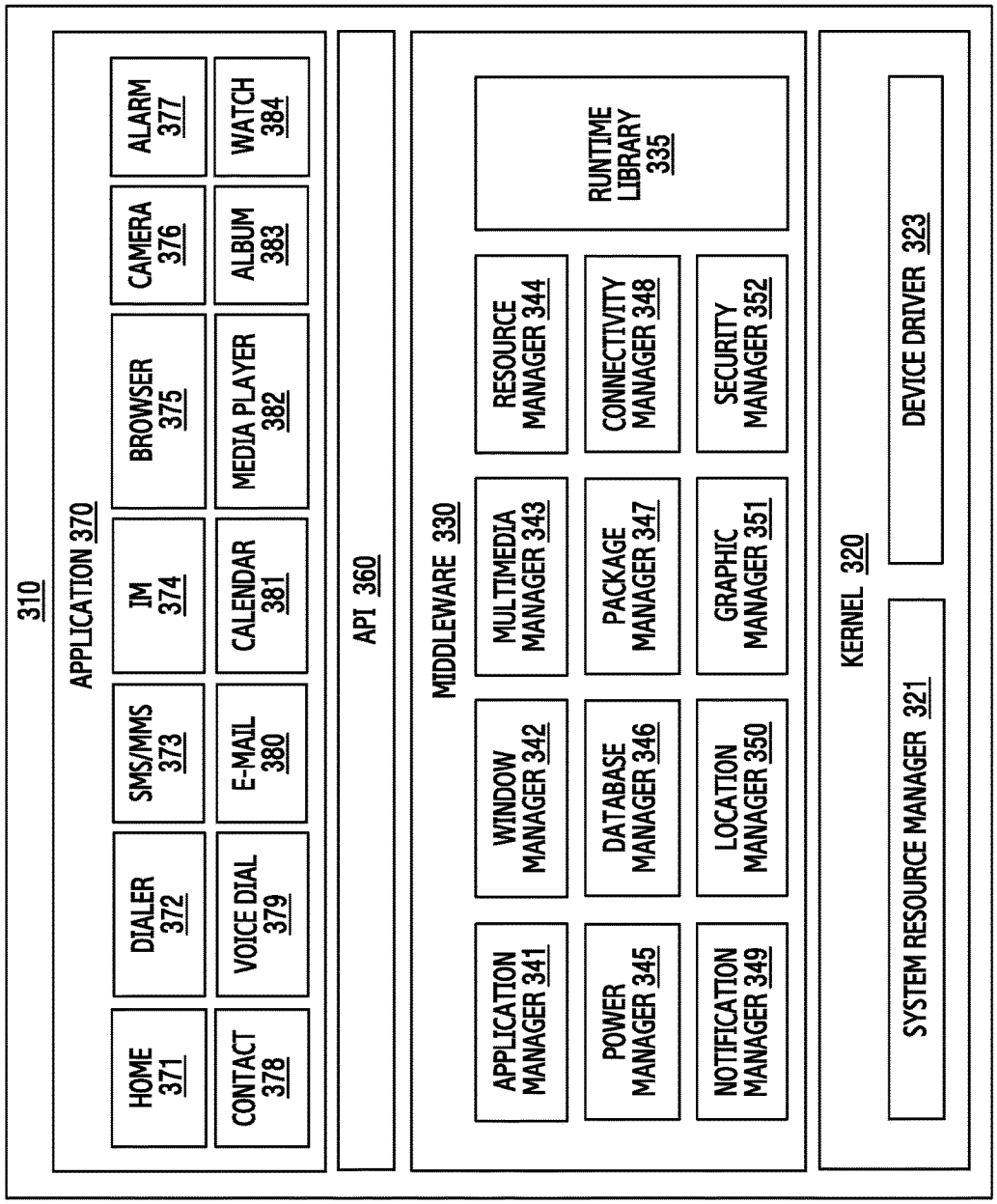
FIG. 3 is a diagram of a program module, according to an embodiment of the present disclosure.

FIG. 3 is a diagram of a program module, according to an embodiment of the present disclosure. The program module 310 may include an OS that controls resources relating to the electronic device 101 and/or the applications 147 that are driven on the OS. The OS may include Android™, iOS™, Windows™, Symbian™, Tizen™, or Bada™.

Referring to FIG. 3, the program module 310 may include a kernel 320, middleware 330, an API 360, and/or applications 370. At least a part of the program module 310 may be preloaded on the electronic device, or may be downloaded from the electronic device 102 or 104 or the server 106.

The kernel 320 may include a system resource manager 321 and/or a device driver 323. The system resource manager 321 may control, allocate, or retrieve system resources. The system resource manager 321 may include a process manager, a memory manager, or a file system manager. The device driver 323 may include a display driver, a camera driver, a BT driver, a shared memory driver, a USB driver, a keypad driver, a Wi-Fi driver, an audio driver, or an inter-process communication (IPC) driver.

The middleware 330 may provide a function required by the applications 370 in common, or may provide various functions to the applications 370 through the API 360 such that the applications 370 can efficiently use limited system resources within the electronic device. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may manage an input/output, manage a memory, or process an arithmetic function. The application manager 341 may manage the life cycles of the applications 370. The window manager 342 may manage GUI resources used for a screen. The multimedia manager 343 may identify formats required for reproducing various media files and may encode or decode a media file using a codec suitable for the corresponding format. The resource manager 344 may manage the source codes of the applications 370 or the space of a memory. The power manager 345 may manage the capacity or power of a battery and may provide power information required for operating the electronic device. The power manager 345 may operate in conjunction with a basic input/output system (BIOS).

The database manager 346 may search, or change databases to be used by the applications 370. The package manager 347 may manage the installation or update of an application that is distributed in the form of a package file.

The connectivity manager 348 may manage a wireless connection. The notification manager 349 may provide an event (e.g. an arrival message, an appointment, a proximity notification, or the like) to a user.

The location manager 350 may manage the location information of the electronic device.

The graphic manager 351 may manage a graphic effect to be provided to a user and a user interface relating to the graphic effect.

The security manager 352 may provide system security or user authentication.

The middleware 330 may include a telephony manager for managing a voice or video call function of the electronic device or a middleware module that is capable of forming a combination of the functions of the above-described elements. The middleware 330 may provide an operating system-specific module. Furthermore, the middleware 330 may dynamically remove some of the existing elements, or may add new elements.

The API 360 is a set of API programming functions, and may be provided with different configurations according to operating systems. In the case of Android™ or iOS™, one API set may be provided for each platform, and in the case of Tizen™, two or more API sets may be provided for each platform.

The applications 370 may include one or more applications that can perform functions such as home application 371, a dialer application 372, SMS/MMS application 373, instant messaging (IM) application 374, a browser application 375, a camera application 376, an alarm application 377, a contacts application 378, a voice dialing application 379, an e-mail application 380, a calendar application 381, a media player application 382, an album application 383, a watch application 384, health-care applications (e.g., for measuring exercise quantity or blood glucose levels), environment information (e.g., atmospheric pressure, humidity, or temperature information) provision applications, and the like. The applications 370 may include an information exchange application that can support the exchange of information between the electronic device and an external electronic device. The information exchange application may include a notification relay application for relaying particular information to an external electronic device or a device management application for managing an external electronic device. The notification relay application may relay notification information generated in the other applications of the electronic device to an external electronic device, or may receive notification information from an external electronic device to provide the received notification information to a user. The device management application may install, delete, or update functions of an external electronic device that communicates with the electronic device (for example, turning on/off the external electronic device itself (or some elements thereof) or adjusting the brightness (or resolution) of a display) or applications executed in the external electronic device. The applications 370 may include applications (e.g., a health care application of a mobile medical appliance) that are designated according to the attributes of an external electronic device. The applications 370 may include applications received from an external electronic device. At least some of the program module 310 may be implemented (e.g., executed) by software, firmware, hardware (e.g., the processor 210), or a combination of two or more thereof and may include a module, a program, a routine, an instruction set, or a process for performing one or more functions.

Figure 4:
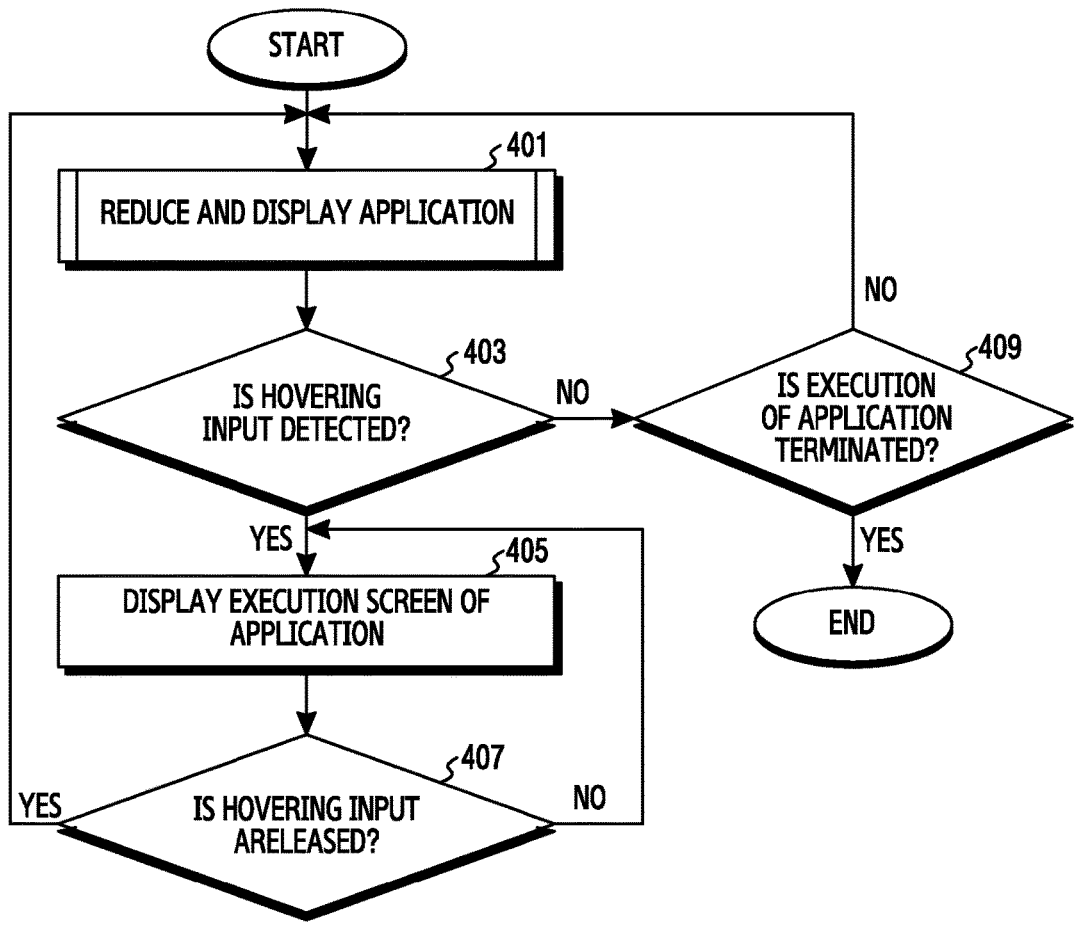
FIG. 4 is a flowchart of a method of switching an application in the electronic device, according to an embodiment of the present disclosure.

FIG. 4 is a flowchart of a method of an application by an electronic device and FIGS. 5A to 5D illustrate screen configurations for switching an application by an electronic device, according to an embodiment of the present disclosure. Hereinafter, unless indicated otherwise, it will be assumed that an electronic device(s) is the electronic device 101 including the processor 120 and/or the other components of FIG. 1.

Figure 5A:
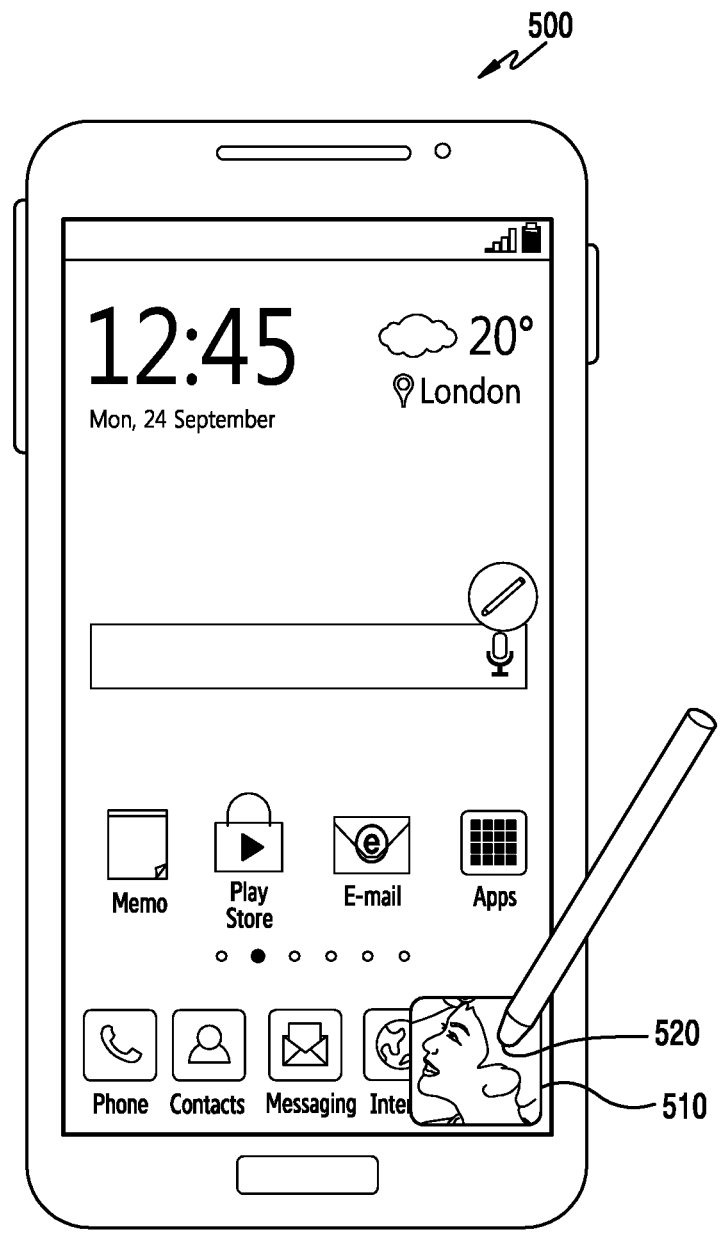
FIGS. 5A to 5D illustrate screen configurations for switching an application in the electronic device, according to an embodiment of the present disclosure.

Referring to FIG. 4, the electronic device 101 may reduce and display application information on areas of the display 160 in operation 401. When generation of an event for reducing and displaying an application is detected, the processor 120 may control the display 160 to display an object corresponding to application information in areas of the display 160. Specifically, the processor 120 may control the display 160 to display an application icon 510 in an area of the display 160, as illustrated in FIG. 5A. The display 160 may display a home screen 500 of the electronic device 101 or an execution screen of another application executed in a background as a background screen. An object corresponding to application information (the icon 510 of the application) may include a captured image of an execution screen of the corresponding application, an execution screen of an application being executed in the electronic device, which is reduced to a reference size, or an icon image predefined for the corresponding application. Based on selection of a control menu or a gesture input that matches an event for reducing and displaying the application, the processor 120 may determine whether the corresponding event is generated.

The electronic device 101 may identify whether a hovering input for application information (e.g., object corresponding to application information) reduced and displayed in at least some areas of the display 160 is detected in operation 403. The processor 120 may identify whether a hovering input 520 is detected within a display area of the icon 510 of the application displayed in areas of the display 160, as illustrated in FIG. 5A.

Figure 5B:
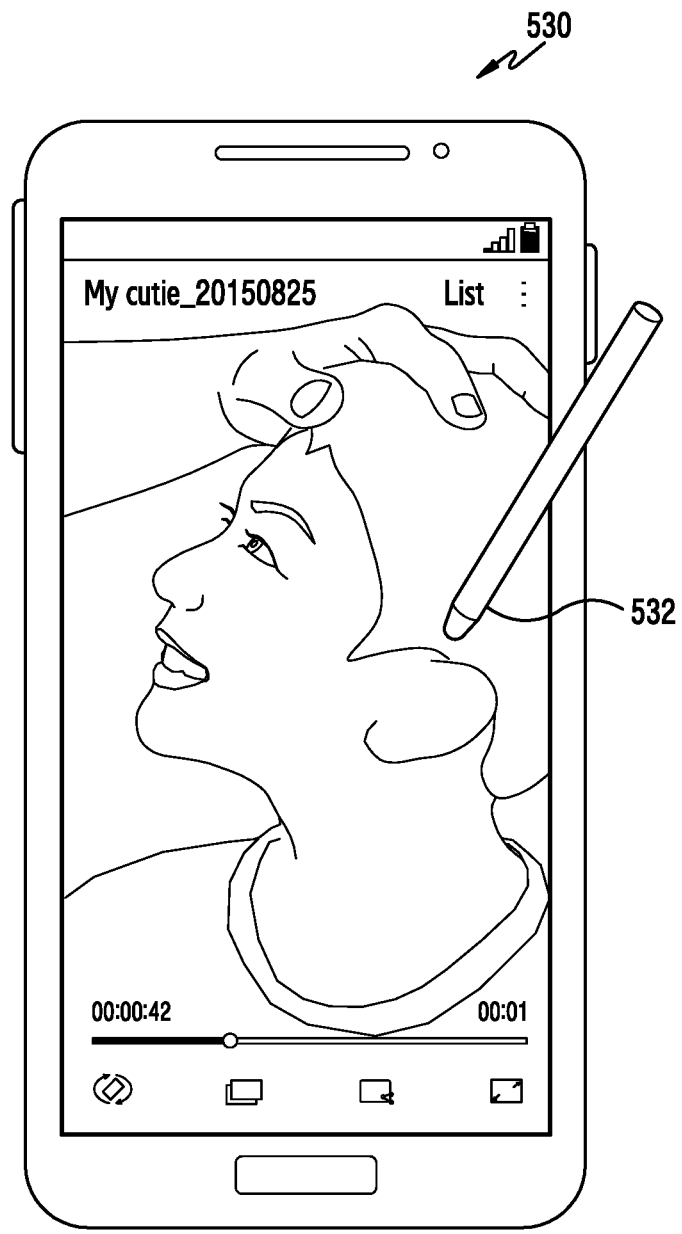
Figure 5C:
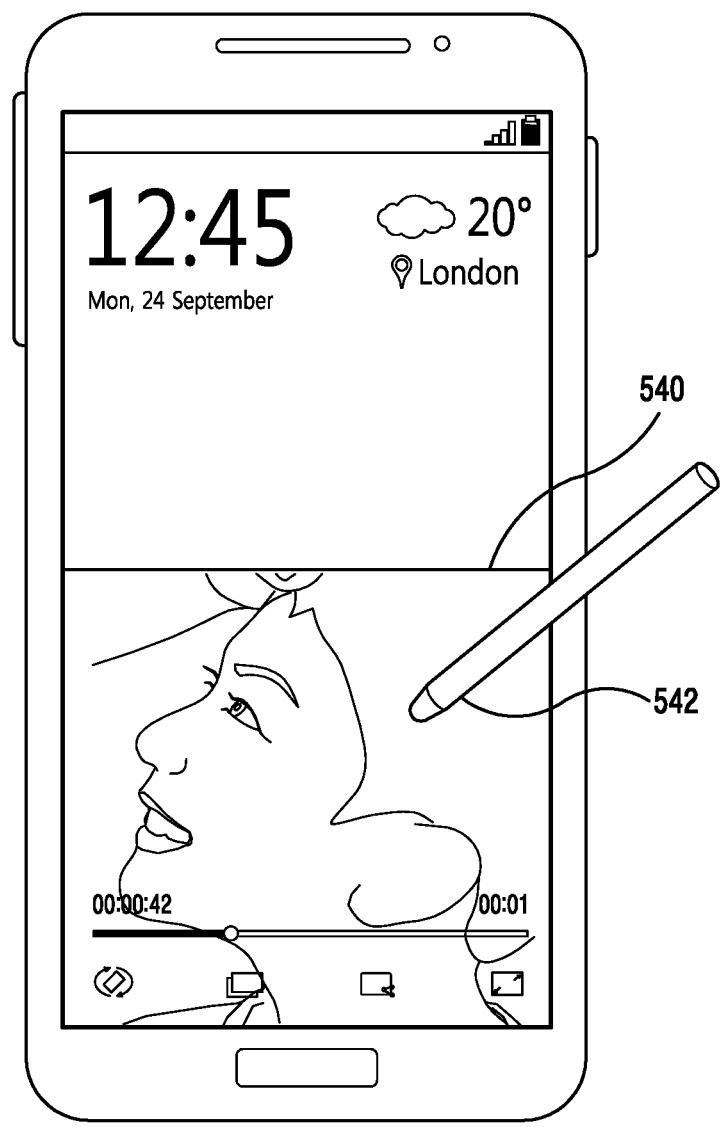
Figure 5D:
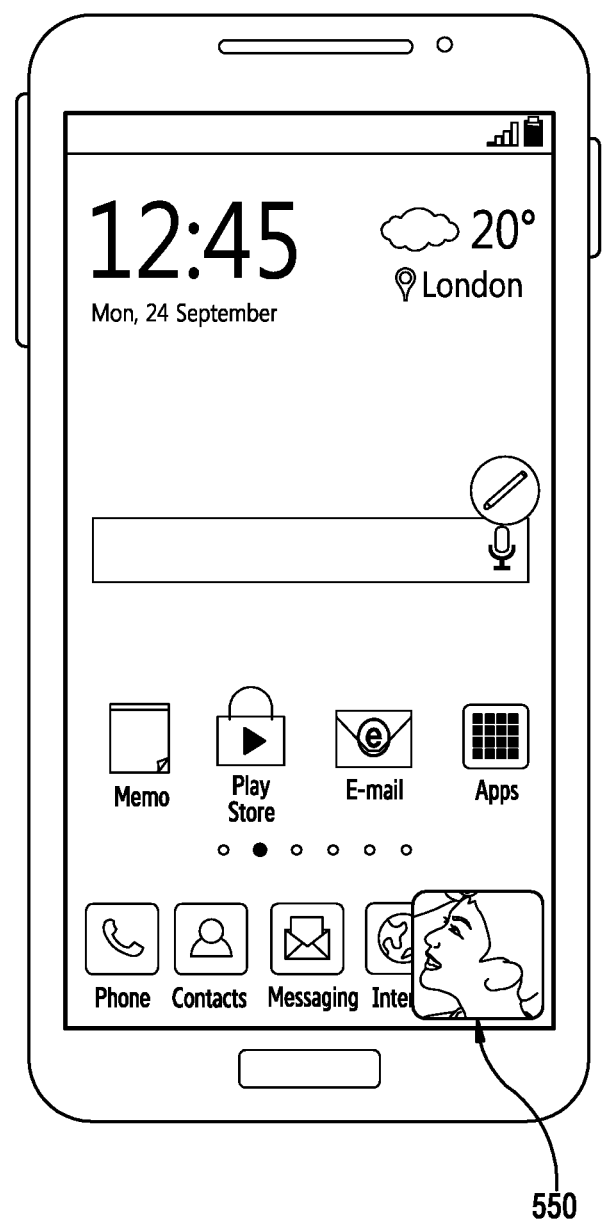

When the hovering input for the application information reduced and displayed in at least some areas of the display 160 is detected, the electronic device 101 may enlarge and display the reduced and displayed application execution screen in operation 405. When the hovering input 520 is detected within the display area of the application icon 510, as illustrated in FIG. 5A, the processor 120 may control the display 160 to display an execution screen 530 of the application corresponding to the application icon 510 in the entire area of the display 160, as illustrated in FIG. 5B. When the hovering input 520 is detected within the display area of the application icon 510, as illustrated in FIG. 5A, the processor 120 may control the display 160 to display an execution screen 540 of the application corresponding to the application icon 510 in an area of the display 160, as illustrated in FIG. 5C. Some areas of the display 160 for displaying the execution screen 540 of the application may be predefined, set based on user input information, or set based on characteristics of the application. The characteristics of the application may include an application type or a service type provided through the application.

The electronic device 101 may identify whether the hovering input for the application is released in a state where the execution of the application is displayed in operation 407. When the hovering input is not detected for a reference time, the processor 120 may determine that the hovering input for the application is released.

When the hovering input for the application is maintained, the electronic device 101 may maintain displaying of the execution screen of the application in operation 405. The processor 120 may provide a service corresponding to the touch input or the hovering input of the execution screen of the application.

When the hovering input for the application is released, the electronic device 101 may reduce and display application information in areas of the display 160 in operation 401. When the hovering input for the execution screen of the application displayed on the display 160 is released, the processor 120 may reduce the execution screen of the application to be an application icon 550 and control the display 160 to display the icon 550 in areas of the display 160. In addition, the processor 120 may capture the application based on a position where the hovering input is released and use the captured application as the application icon 550.

When the hovering input for application information reduced and displayed in an area of the display 160 is not detected, the electronic device 101 may identify whether the execution of the reduced and displayed application is terminated in operation 409. When the application icon displayed in an area of the display 160 moves to a predefined deletion area, the processor 120 may determine that the execution of the application is terminated. When the reduced and displayed application information is deleted from a recently used application list, the processor 120 may determine that the execution of the application is terminated. When the reduced and displayed application is executed in the recently used application list or the home screen, the processor 120 may determine to delete the reduced displaying of the corresponding application.

When the execution of the reduced and displayed application is maintained, the electronic device 101 may maintain the reduced displaying of the application in operation 401.

The electronic device 101 may edit the application icon displayed in areas of the display 160 to display the reduced application.

FIGS. 6A to 6D illustrate screen configurations for deleting or moving the application icon in the electronic device 101, according to an embodiment of the present disclosure.

Figure 6A:
FIGS. 6A to 6D illustrate screen configurations for deleting an application icon or moving a location thereof in the electronic device, according to an embodiment of the present disclosure.

When generation of an event for reducing and displaying an application is detected, the electronic device 101 may display an application icon 602 in areas (e.g., a lower right portion) of the display 160, as illustrated in FIG. 6A. The electronic device 101 may display a home screen as a background screen of the display 160. The electronic device 101 may display the application icon 602 to be translucent so that the user can recognize information in a part that overlaps the application icon 602 in the background screen.

When a touch input (e.g., a tap input) for the application icon 602 is detected, the electronic device 101 may display a deletion icon 600 for deleting the application icon 602 on the display 160, as illustrated in FIG. 6A. The processor 120 may control the display 160 to display the deletion icon 600 in a predefined deletion area in order to delete the application icon 602.

Figure 6B:
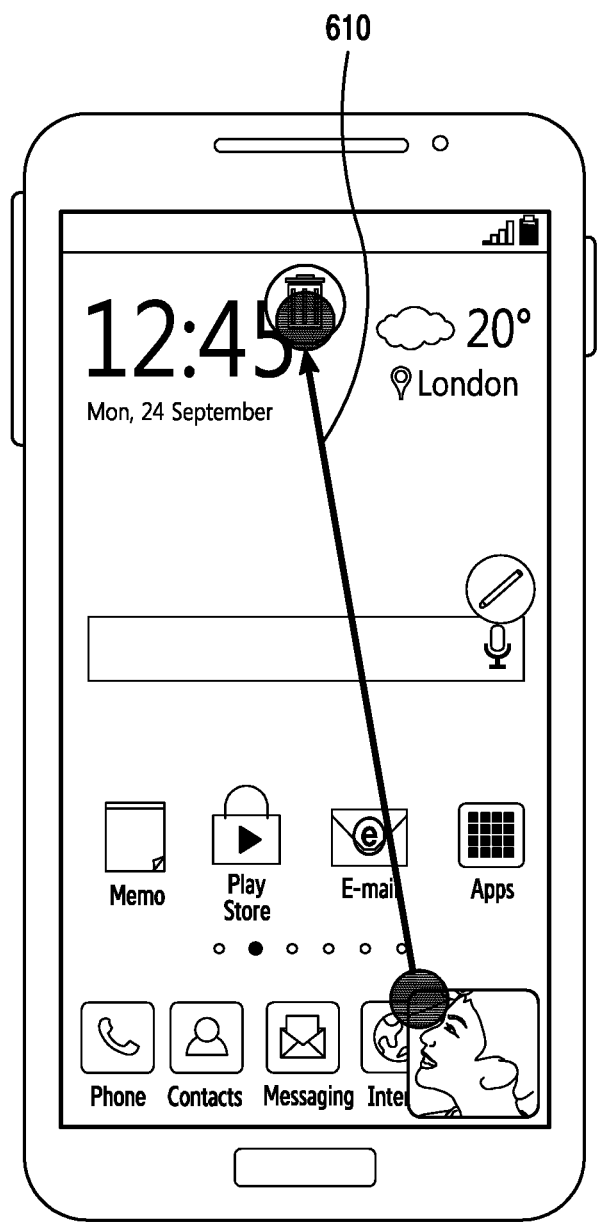

When the application icon 602 is close to the deletion icon 600, as indicated by a reference numeral 610 of FIG. 6B, the electronic device 101 may delete the application icon 602.

When at least a part of the application icon 602 enters the deletion area including the deletion icon 600 based on touch movement information 610 of the application icon 602, the processor 120 may delete the application icon 602.

Figure 6C:
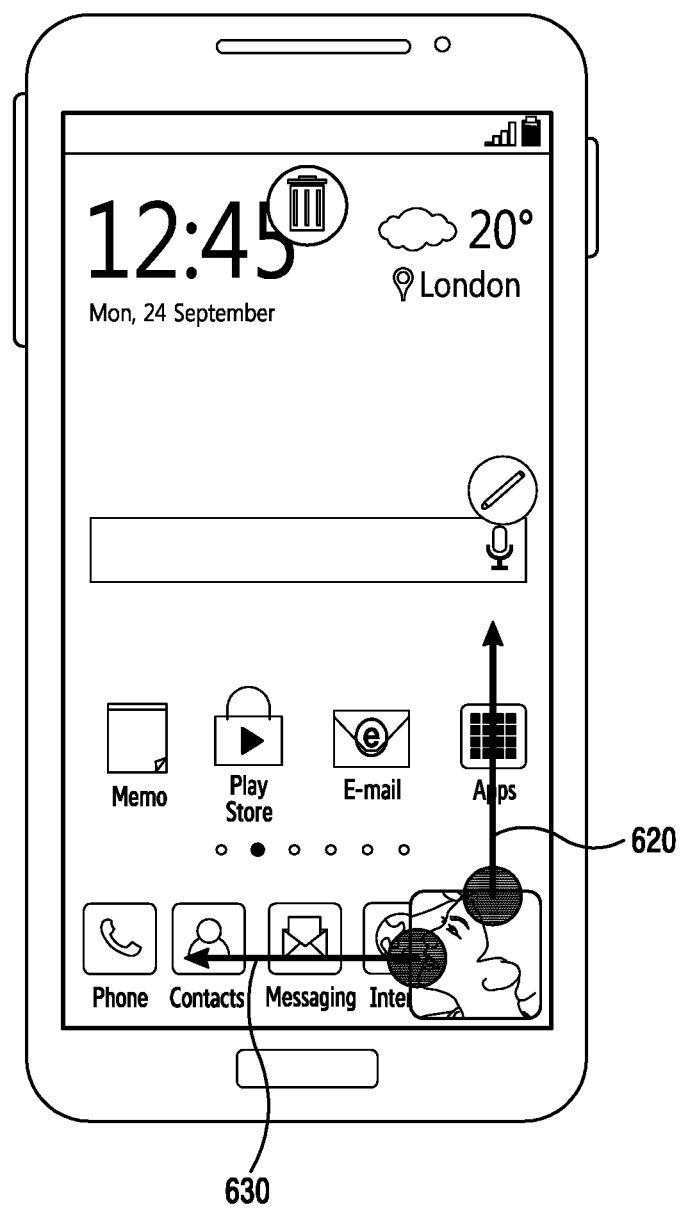
Figure 6D:
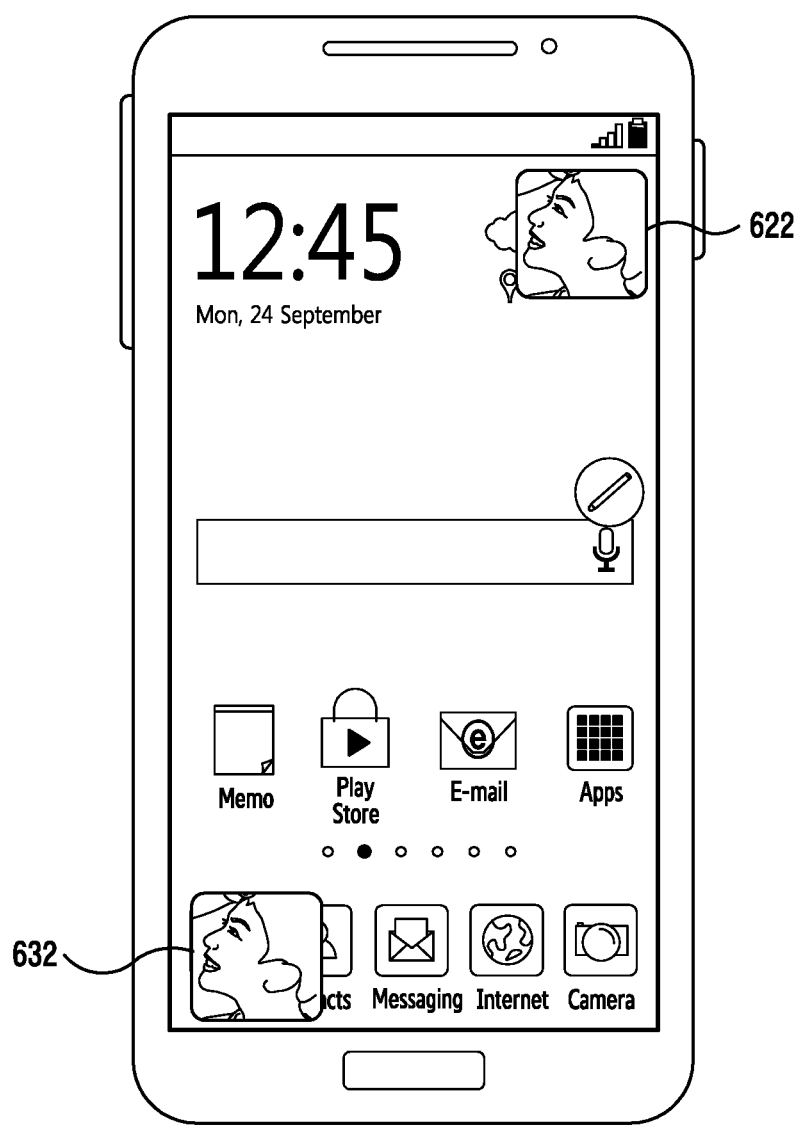

The electronic device 101 may change a location of the application icon 602 based on a touch movement of the application icon 602. When a touch movement 620 in an upward direction of the application icon 602 is detected, as illustrated in FIG. 6C, the processor 120 may change the location of the application icon 602 to an upper right portion of the display 160, as indicated by reference numeral 622 of FIG. 6D. When a touch movement 630 in a left direction of the application icon 602 is detected, as illustrated in FIG. 6C, the processor 120 may change the location of the application icon 602 to a lower left portion of the display 160, as indicated by reference numeral 632 of FIG. 6D. The processor 120 may change the location of the application icon 602 to a position where the touch input of the application icon 602 is released. When a display location of the application icon 602 is designated, the processor 120 may change the location of the application icon 602 to a display location which is the closest to the position where the touch input of the application icon 602 is released.

Figure 7A:
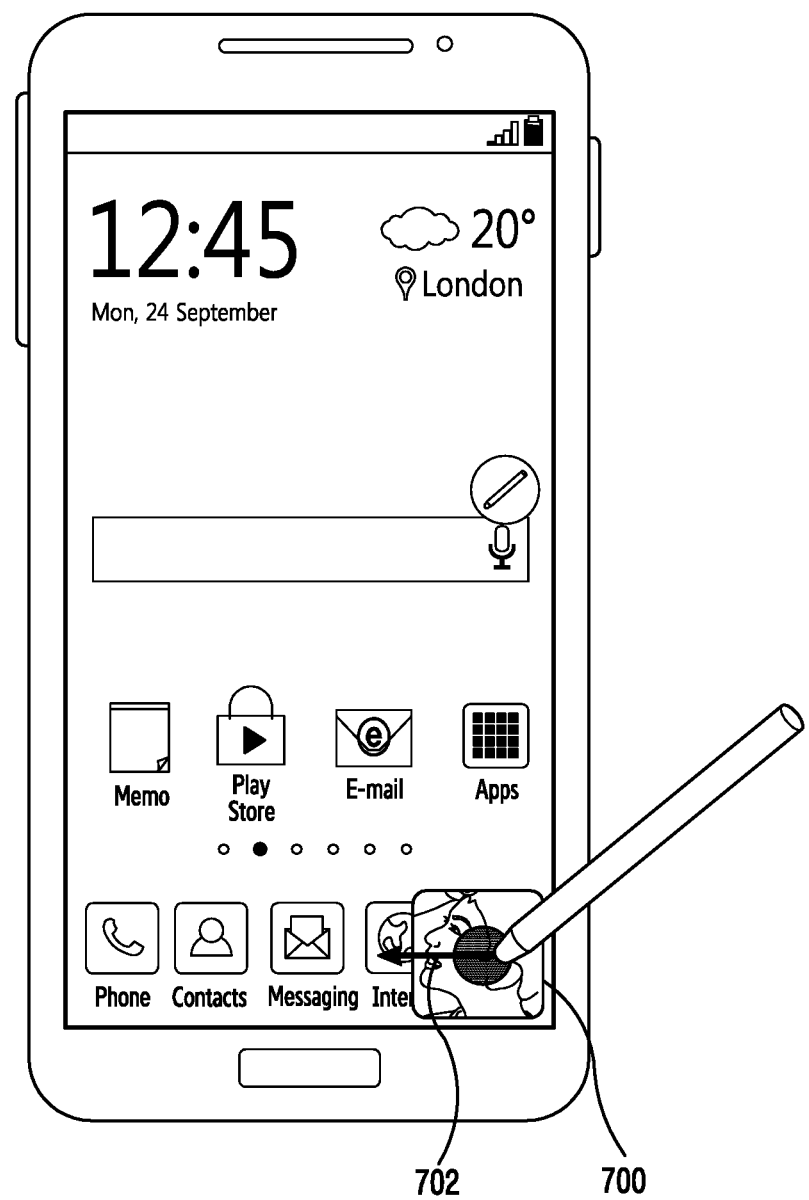
FIGS. 7A and 7B illustrate screen configurations for changing content of an application icon in the electronic device, according to an embodiment of the present disclosure.
Figure 7B:

FIGS. 7A and 7B illustrate screen configurations for changing the content of the application icon in the electronic device, according to an embodiment of the present disclosure.

When a touch input 702 (e.g., a swipe input) for an application icon 700 is detected, as illustrated in FIG. 7A, the electronic device 101 may change display information of the application icon 700, as indicated by a reference numeral 710 of FIG. 7B. When the swipe input for the application icon 700 is detected, the processor 120 may change the application icon 700 into another icon 710 for the corresponding application. The other icon 710 may include an application execution screen switched by the swipe input or a captured image of the application execution screen. When the swipe input for the application icon 602 is detected, the processor 120 may change the application icon 700 into the icon 710 for the other application. The other application may include an application which has been previously reduced and displayed or an application being executed in a background.

The processor 120 may change the application icon 700 based on a direction of the swipe input for the application icon 602. When a swipe input for the application icon 700 in a first direction (e.g., left direction) is detected, the processor 120 may change the application icon 700 into the previously displayed application icon 710. When a swipe input for the application icon 700 in a second direction (e.g., right direction) is detected, the processor 120 may change the application icon 700 into the application icon 710 which can be displayed next.

Figure 8A:
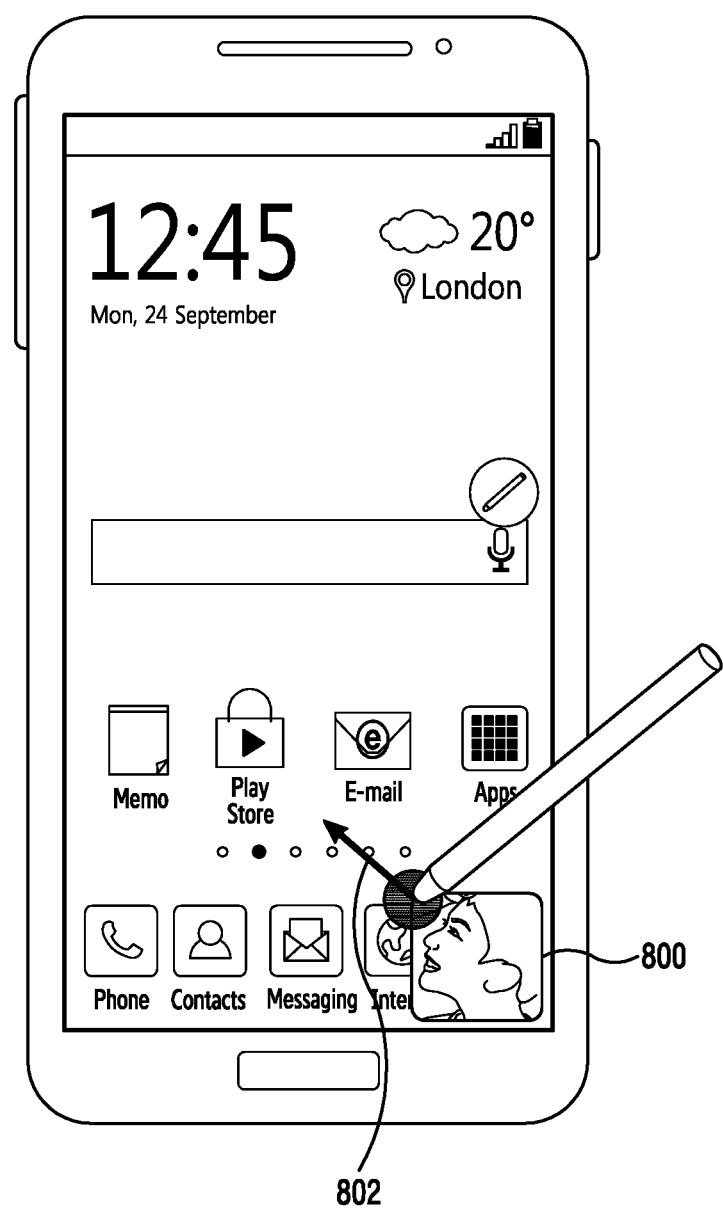
FIGS. 8A and 8B illustrate screen configurations for changing a size of an application icon in the electronic device, according to an embodiment of the present disclosure.
Figure 8B:
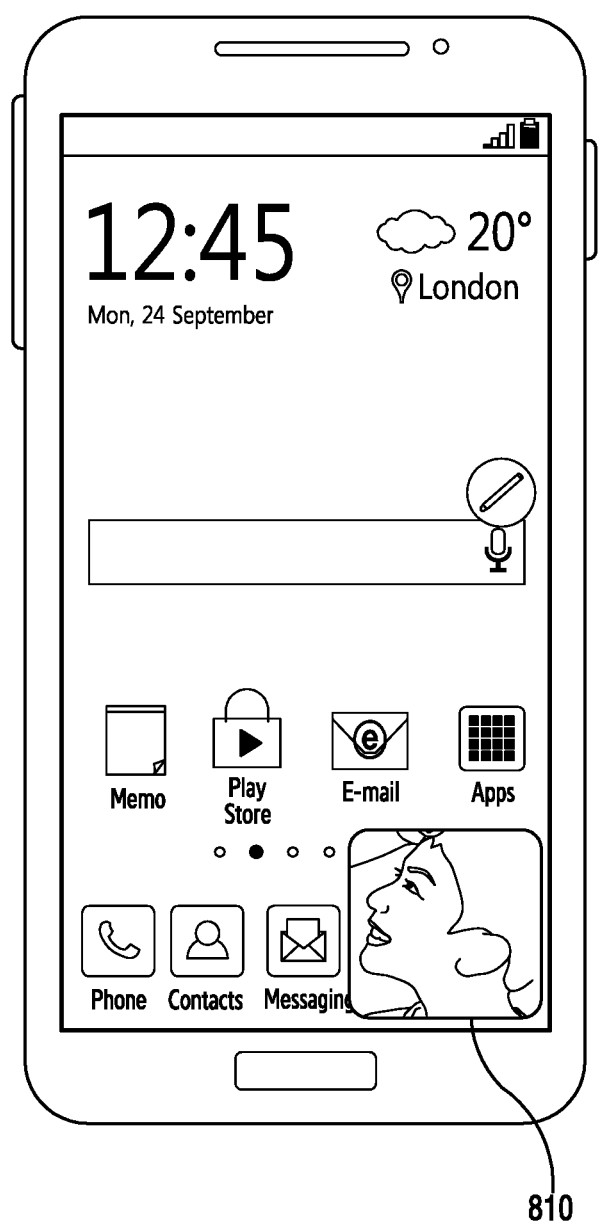

FIGS. 8A and 8B illustrate screen configurations for changing a size of the application icon in the electronic device, according to an embodiment of the present disclosure.

When a touch movement 802 is detected in a predefined area of an application icon 800, as illustrated in FIG. 8A, the electronic device 101 may change a size of the application icon 800 in accordance with the touch movement 802, as indicated by a reference numeral 810 of FIG. 8B. When the touch movement 802 for an edge of the application icon 800 is detected, the processor 120 may enlarge the size of the application icon 800 in accordance with a distance of the touch movement 802, as indicated by the reference numeral 810.

Figure 9A:
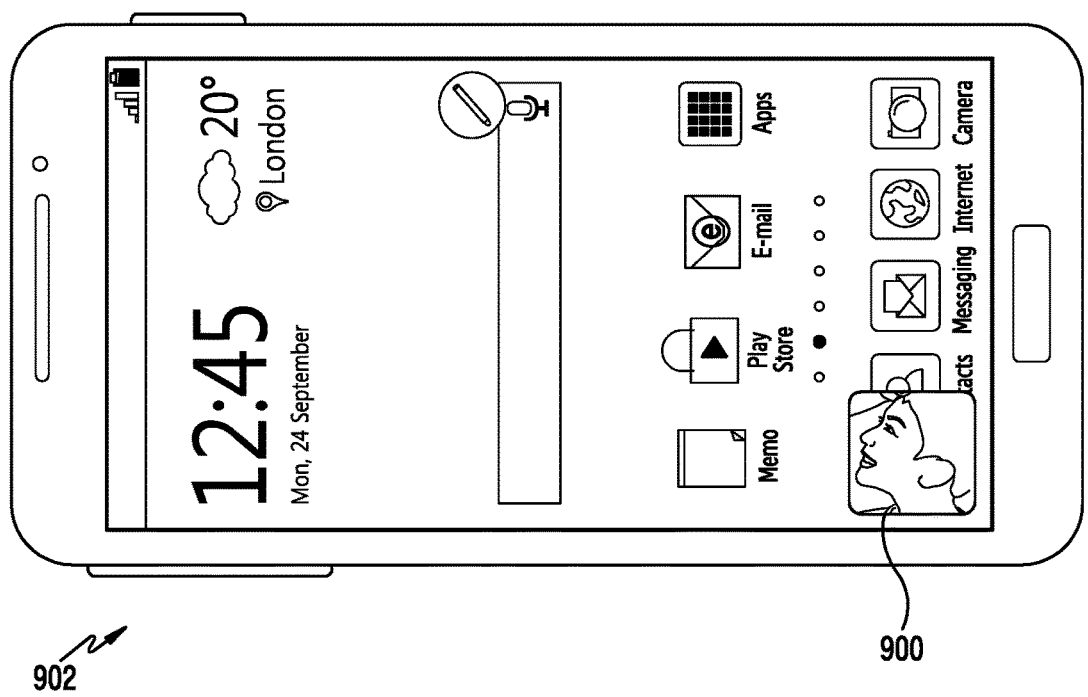
FIGS. 9A to 9C illustrate screen configurations for rotating a screen in the electronic device, according to an embodiment of the present disclosure.
Figure 9B:
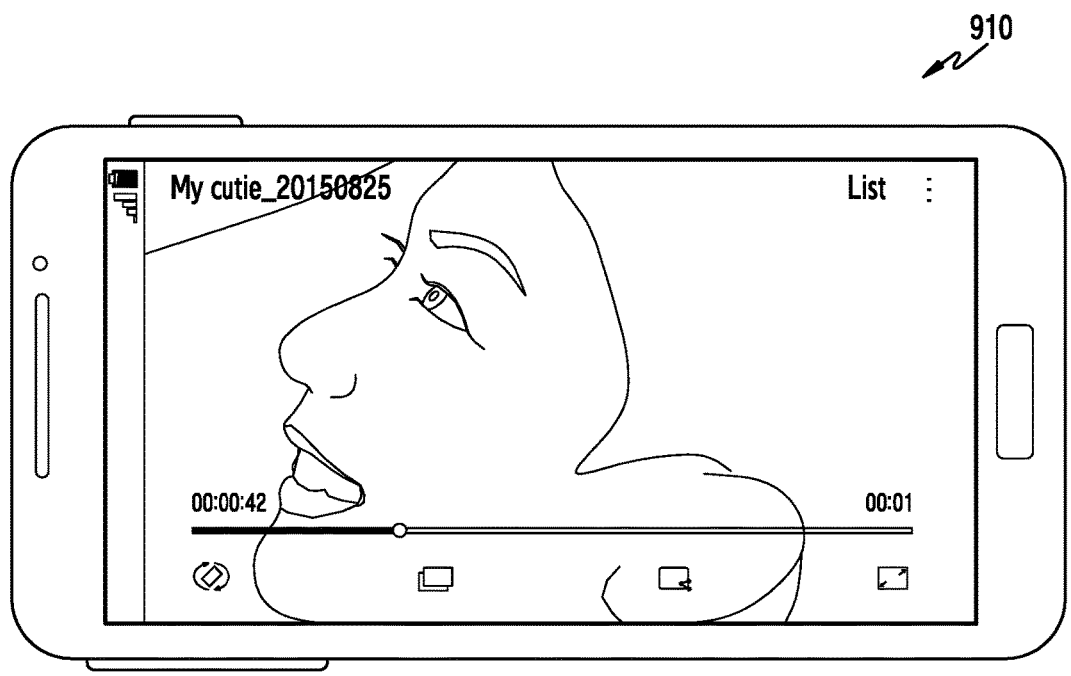
Figure 9C:
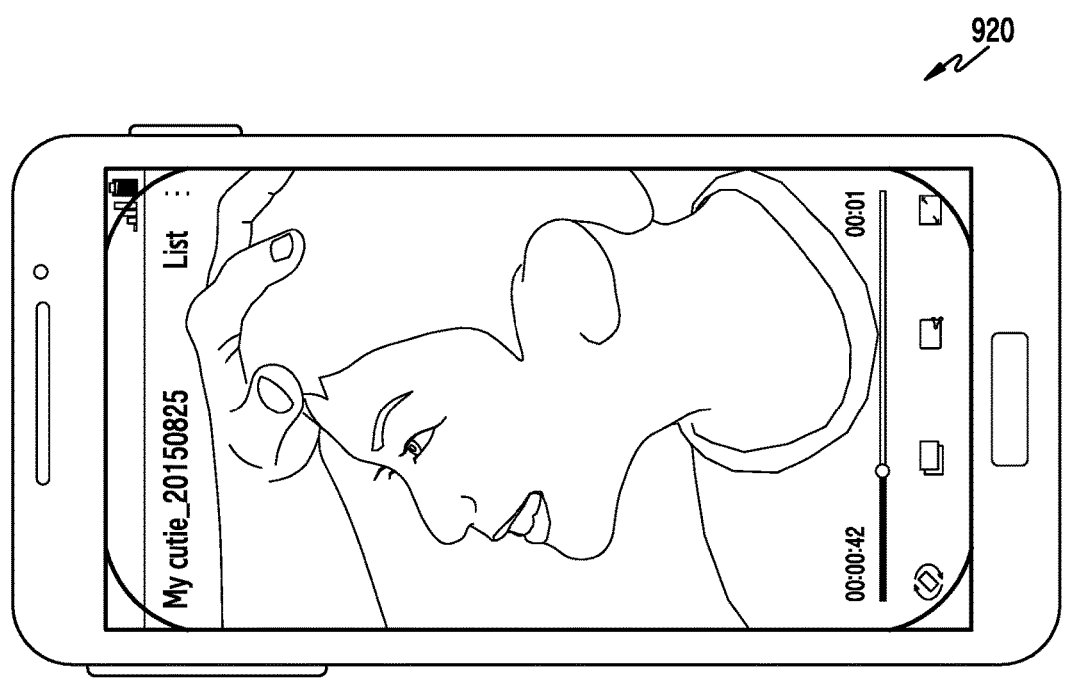

FIGS. 9A to 9C illustrate screen configurations for rotating the screen in the electronic device, according to an embodiment of the present disclosure.

When the electronic device 101 rotates in a state where an application icon 900 is displayed in areas of the display 160, the electronic device 101 may switch a location and a display direction of the application icon 900 in response to the rotation of the electronic device 101, as indicated by a reference numeral 902 of FIG. 9A.

When a hovering input for the application icon 900 displayed in an area of the display is detected, as illustrated in FIG. 9A, the electronic device 101 may display an application execution of the application corresponding to the application icon 900 on the display 160. The electronic device 101 may differently display the display direction of the execution screen of the application depending on whether a screen rotation mode of the application is supported. When the screen rotation mode of the application corresponding to the application icon 900 is supported, the processor 120 may display the execution screen of the application in the same direction as the rotation direction of the electronic device 101, as indicated by reference numeral 910 of FIG. 9B (e.g., landscape mode). When the screen rotation mode of the application corresponding to the application icon 900 is not supported, the processor 120 may display the execution screen of the application regardless of the rotation direction of the electronic device 101, as indicated by reference numeral 920 of FIG. 9C (e.g., portrait mode).

Figure 10:
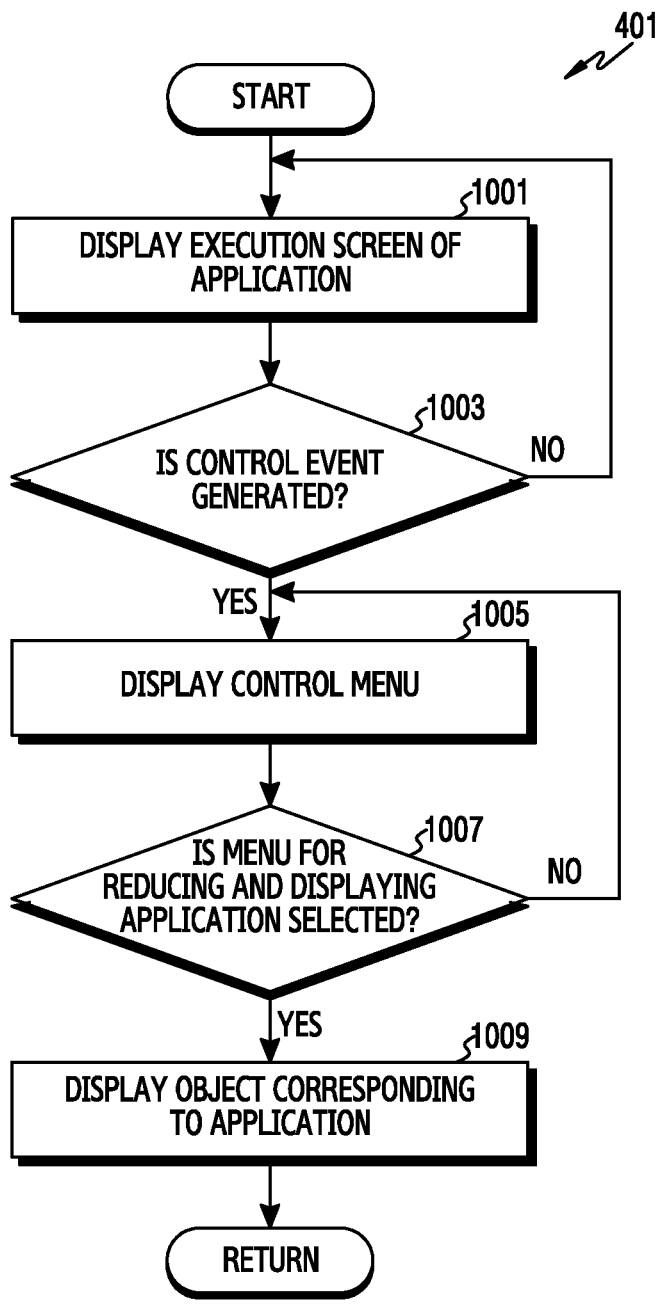
FIG. 10 is a flowchart of a method of reducing and displaying information on an application being executed in the electronic device, according to an embodiment of the present disclosure.

FIG. 10 is a flowchart of a method of reducing and displaying information on the application being executed in the electronic device, according to an embodiment of the present disclosure. FIGS. 12A to 12D illustrate screen configurations for reducing and displaying information on the application in the electronic device, according to an embodiment of the present disclosure. Hereinafter, a method of reducing and displaying information on the application in operation 401 of FIG. 4 will be described.

Figure 12A:
FIGS. 12A to 12D illustrate screen configurations for reducing and displaying information on an application in the electronic device, according to an embodiment of the present disclosure.

Referring to FIG. 10, the electronic device 101 may display an execution screen of the application executed in the electronic device 101 on the display 160 in operation 1001. When the application to be executed is selected based on an input detected through the input/output interface 150 or the display 160, the processor 120 may control the display 160 to display the execution screen of the corresponding application. Specifically, when a gallery application is selected, the processor 120 may control the display 160 to display an execution screen 1200 of the gallery application, as illustrated in FIG. 12A.

The electronic device 101 may identify whether a control event is generated in operation 1003. When a separation of the electronic pen from the electronic device 101 is detected, the processor 120 may determine whether the control event is generated. When a selection input of a menu icon is detected based on an input detected through the input/output interface 150 or the display 160, the processor 120 may determine whether the control event is generated. When a gesture input corresponding to the control event is detected through at least one sensor functionally connected to the electronic device 101, the processor 120 may determine whether the control event is generated.

When the control event is not generated, the electronic device 101 may maintain displaying of the execution screen of the application in operation 1001.

Figure 12B:
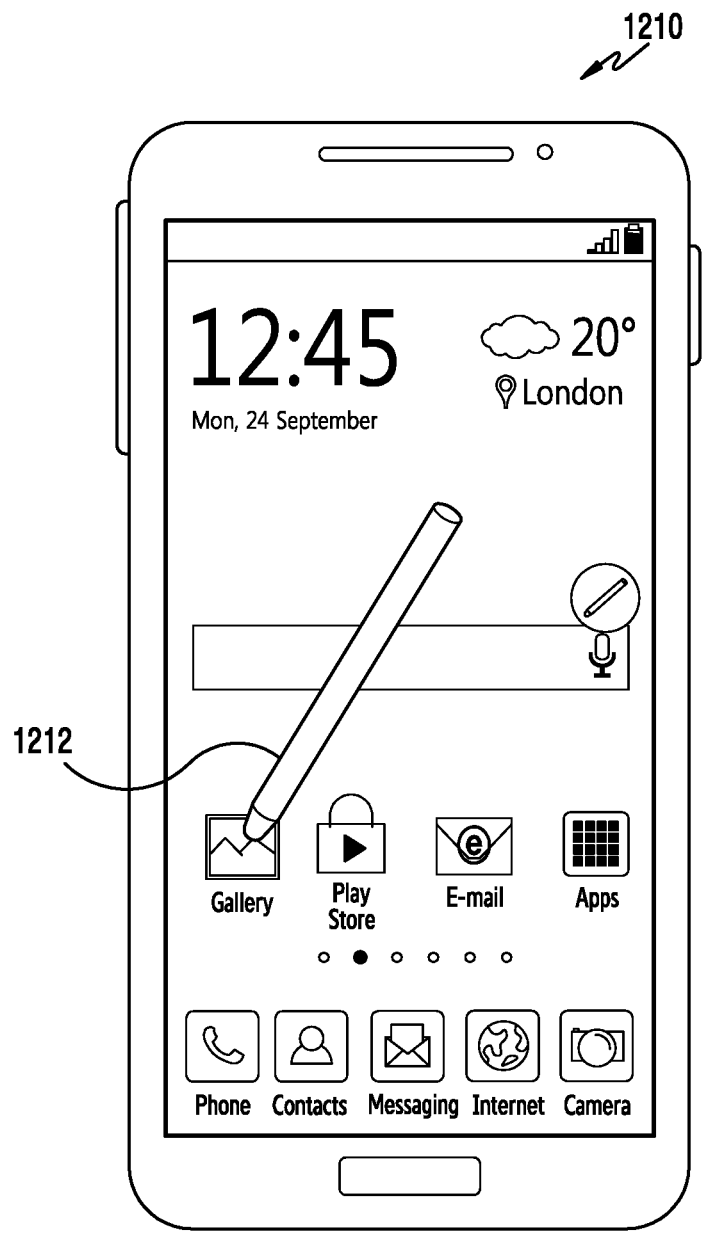
Figure 12C:
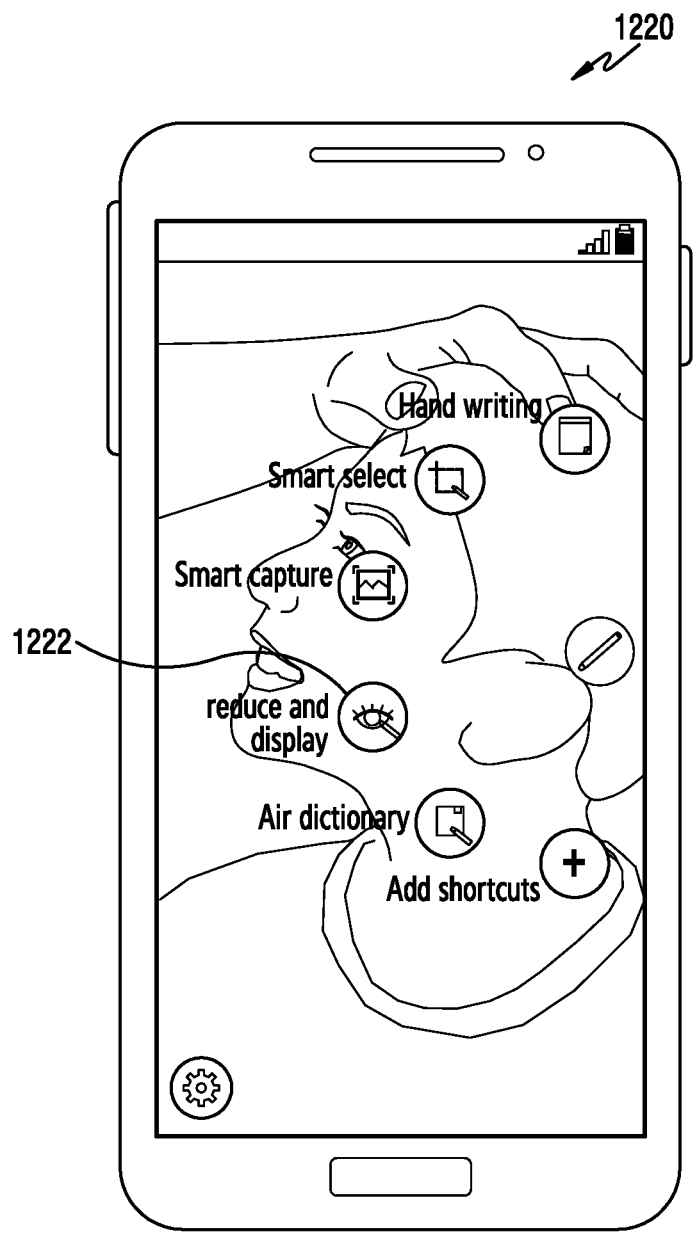

When the generation of the control event is detected, the electronic device 101 may display at least one control menu corresponding to the control event on the display 160 in operation 1005. The processor 120 may control the display 160 to display at least one short-cut menu 1220 (e.g., an air command menu) corresponding to the control event, as illustrated in FIG. 12C.

The electronic device 101 may identify whether a selection input of a menu for reducing and displaying the application is detected in operation 1007. The processor 120 may identify whether a selection input of a reducing and displaying menu 1222 of the short-cut menu 1220 displayed on the display 160 is detected, as illustrated in FIG. 12C.

When the selection input of the menu for reducing and displaying the application is not detected, the electronic device 101 may maintain the displaying of at least one control menu corresponding to the control event in operation 1005. When an input corresponding to the control menu is not detected until a reference time frame passes from a time point when the control menu is displayed, the processor 120 may release the displaying of the control menu.

When the selection input of the menu for reducing and displaying the application is detected, the electronic device 101 may display an object corresponding to the execution screen of the application displayed on the display 160 in areas of the display in operation 1009. The processor 120 may set a captured image of the execution screen of the application as an icon of the application and control the display 160 to display the icon in an area of the display 160. The processor 120 may reduce the execution screen of the application being executed in the electronic device 101 to a reference size and control the display 160 to display the reduced execution screen in an area of the display 160. The processor 120 may control the display 160 to display a preset icon image of the application in an area of the display 160.

Figure 11:
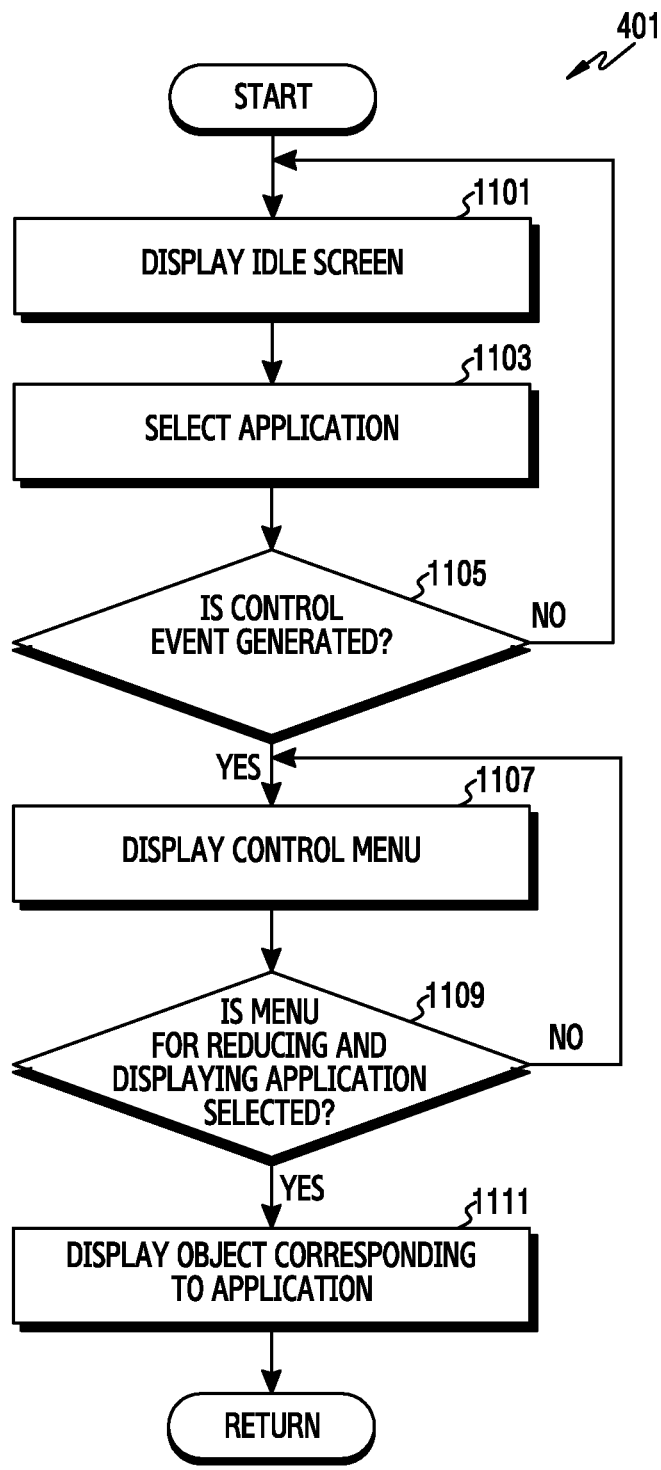
FIG. 11 is a flowchart of a method of reducing and displaying information on an application in the electronic device, according to an embodiment of the present disclosure.

FIG. 11 is a flowchart of a method of reducing and displaying information on the application in the electronic device, according to an embodiment of the present disclosure. Hereinafter, a method of reducing and displaying information on the application in operation 401 of FIG. 4 will be described.

Referring to FIG. 11, the electronic device 101 may display an idle screen including an icon of at least one application on the display in operation 1101. The processor 120 may control the display 160 to display a home screen 1210 of the electronic device 101, as illustrated in FIG. 12B. For example, the home screen 1210 may include an icon, a menu button, and a search bar for at least one application installed in the electronic device 101.

The electronic device 101 may select at least one application from the applications displayed on the idle screen in operation 1103. The processor 120 may determine that an application (e.g., a gallery application) corresponding to an icon on which a hovering input 1212 is detected is selected by a user input among the application icons displayed on the home screen 1210.

The electronic device 101 may identify whether a control event is generated in operation 1105. When a selection input of a menu icon is detected through the input/output interface 150 or the display 160 in a state where the selection for the application is maintained, the processor 120 may determine that the control event for the application is generated. When a gesture input corresponding to the control event is detected through at least one sensor functionally connected to the electronic device 101 in a state where the selection for the application is maintained, the processor 120 may determine that the control event for the application is generated.

When the control event is not generated, the electronic device 101 may maintain the displaying of the idle screen in operation 1101.

When the generation of the control event is detected, the electronic device 101 may display at least one control menu corresponding to the control event on the display 160 in operation 1107. For example, the processor 120 may control the display 160 to display at least one short-cut menu 1220 corresponding to the selected application in operation 1103, as illustrated in FIG. 12C.

The electronic device 101 may identify whether a selection input of a menu for reducing and displaying the application is detected on the control menu displayed on the display in operation 1109.

When the selection input of the menu for reducing and displaying the application is not detected, the electronic device 101 may maintain the displaying of at least one control menu corresponding to the application in operation 1107. For example, when the input for the control menu is not detected for a reference time frame, the processor 120 may release the displaying of the control menu.

When the selection input of the menu for reducing and displaying the application is detected, the electronic device 101 may display an object corresponding to the application (application selected in operation 1103) in a reference area of the display 160 in operation 1111. The object corresponding to the application may include a captured image of the application execution screen, a reduced application execution screen being executed, or a preset icon image for the application.

After detecting the generation of the control event or after detecting the selection input of the menu for reducing the application, the electronic device 101 may select the application to be reduced and displayed.

Figure 12D:
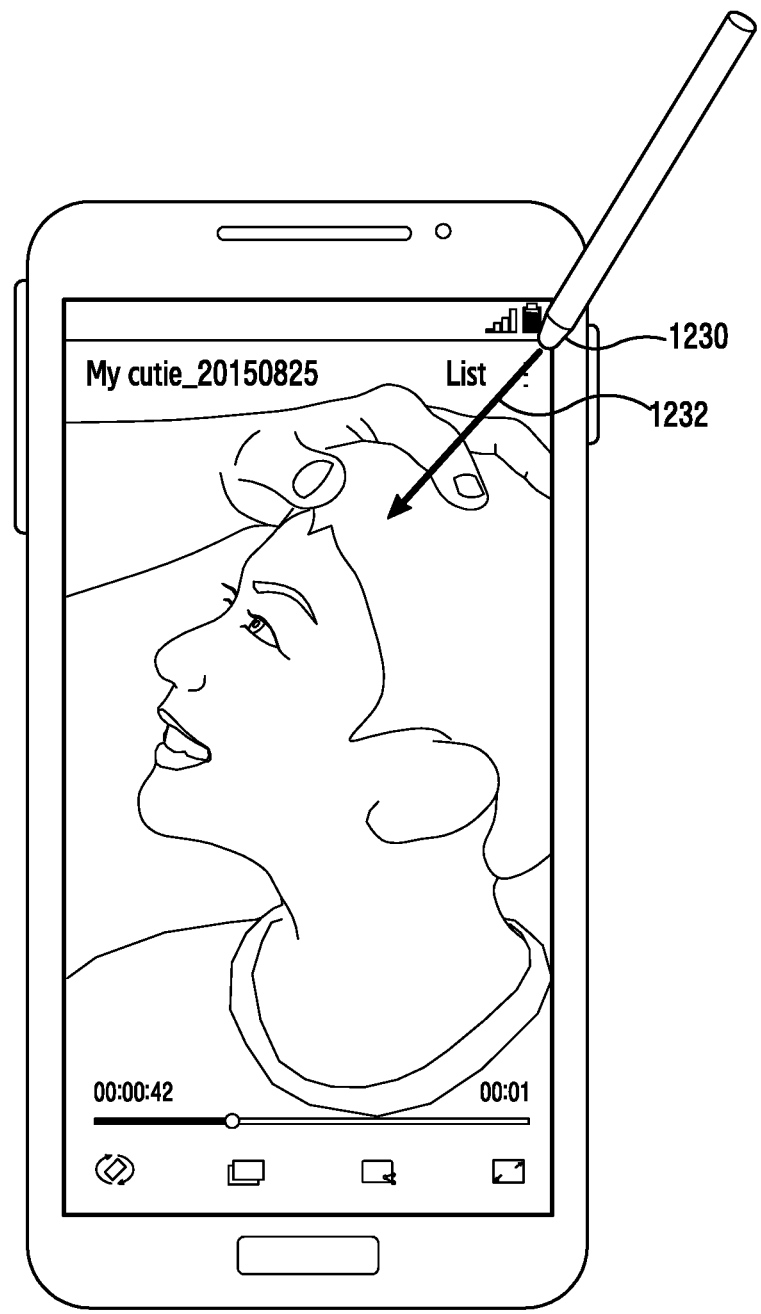

The electronic device 101 may reduce and display information on the application based on the gesture input for reducing and displaying the application. When gesture inputs 1230 and 1232 for reducing the application are detected through a reference area of the application execution screen (e.g., an upper right edge), as illustrated in FIG. 12D, the processor 120 may determine that an event for reducing and displaying the information on the corresponding application is generated. When the gesture input for the reference area meets a predefined condition (e.g., a reference distance) for reduced displaying, the processor 120 may determine that the event for reducing and displaying the application is generated. The processor 120 may control the display 160 to display an object corresponding to the application displayed on the display 160 in at least some areas of the display 160 in response to the generation of the event for reducing and displaying the application. The gesture input for reducing the application may include a touch movement or a hovering movement.

Figure 13:
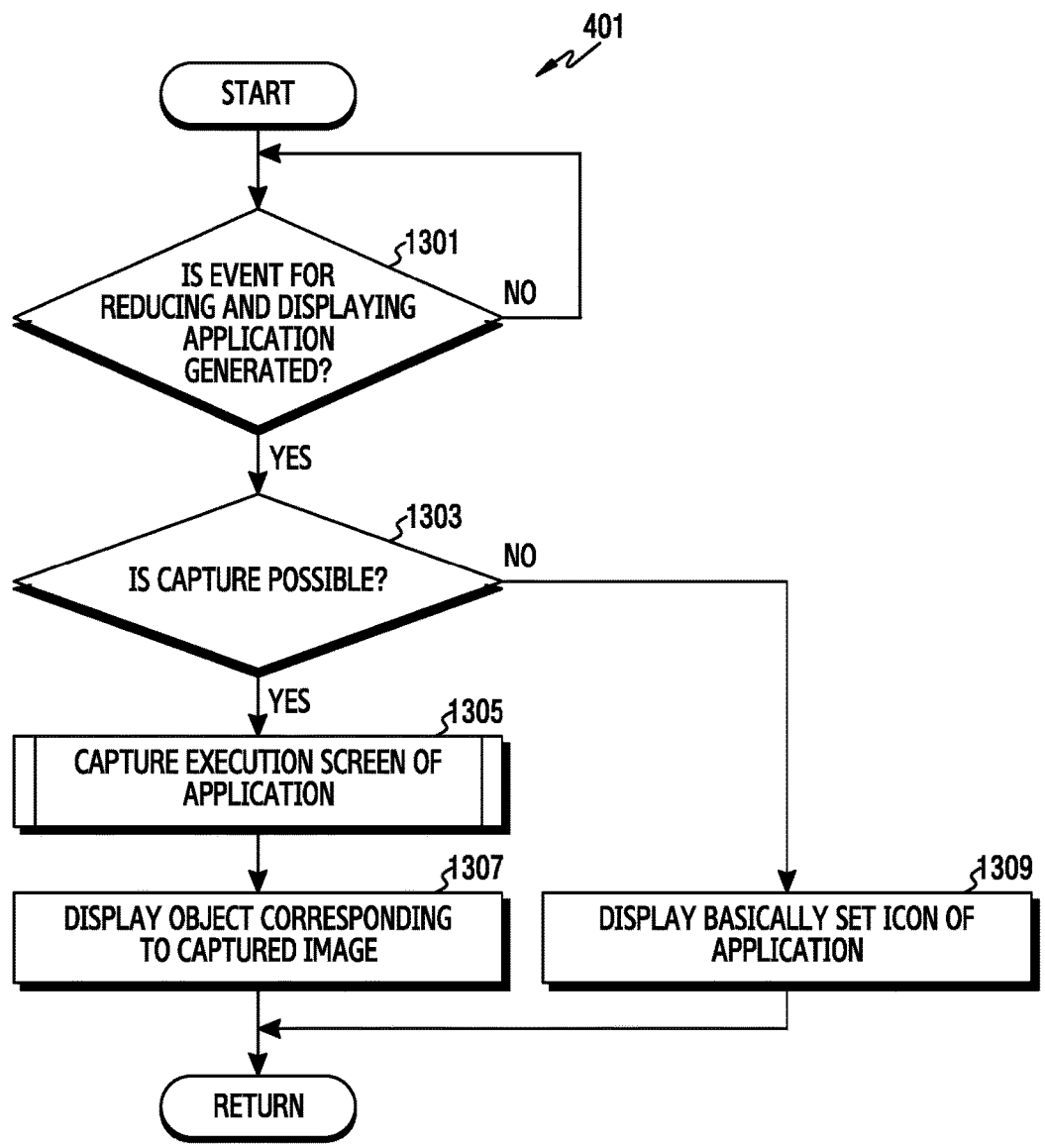
FIG. 13 is a flowchart of a method for displaying an application icon in the electronic device, according to an embodiment of the present disclosure.
Figure 14A:
FIGS. 14A and 14B illustrate screen configurations for displaying an application icon in the electronic device, according to an embodiment of the present disclosure.
Figure 14B:
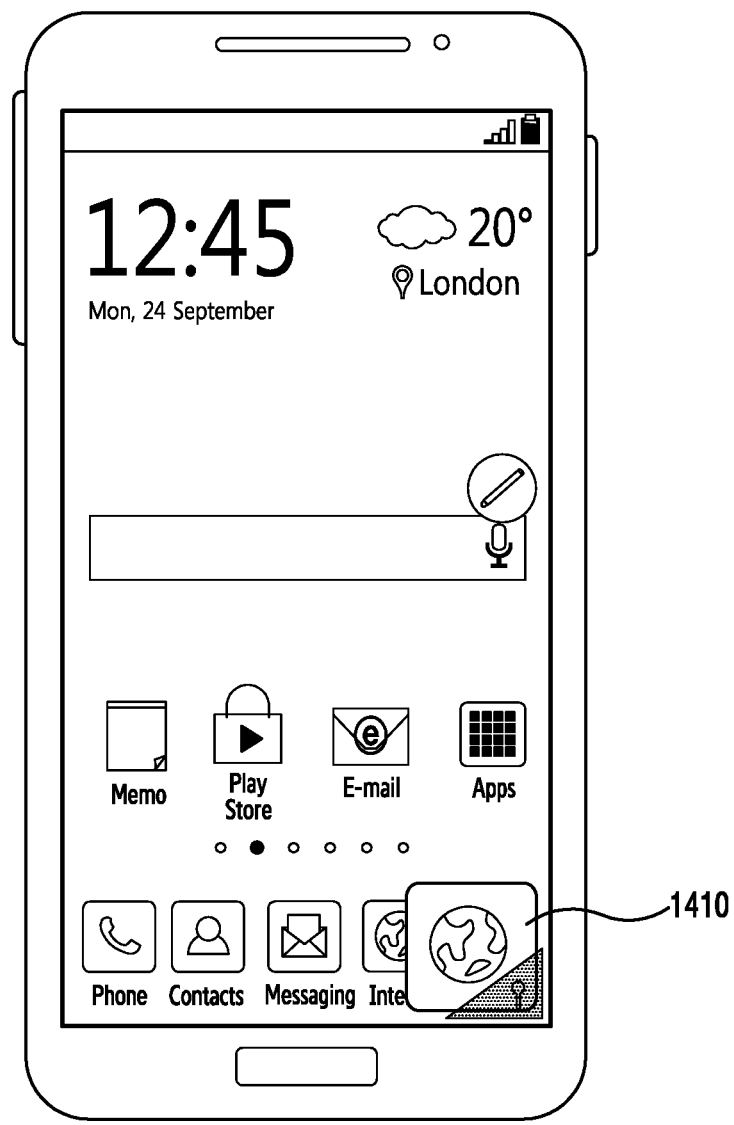

FIG. 13 is a flowchart of a method of displaying an application icon in the electronic device, according to an embodiment of the present disclosure. FIGS. 14A and 14B illustrate screen configurations for displaying the application icon in the electronic device according to various embodiments of the present disclosure. Hereinafter, a method of reducing and displaying information on the application in operation 401 of FIG. 4 will be described.

Referring to FIG. 13, the electronic device 101 may identify whether generation of an event for reducing and displaying information on the application is detected in operation 1301. The processor 120 may identify whether the generation of the event for reducing and displaying the information on the corresponding application is detected in a state where the execution screen of the application is displayed on the display 160. When the generation of the event for reducing and displaying the application is detected, the processor 120 may identify whether an application to be reduced and displayed is selected.

When the generation of the event for reducing and displaying the information on the application is detected, the electronic device 101 may identify whether the execution screen of the application to be reduced and displayed can be captured in operation 1303. For example, the processor 120 may determine whether the execution screen of the application can be captured based on at least one of a type of the application to be reduced and displayed, a service type of the corresponding application, and a security setting level of the corresponding application.

When the execution screen of the application can be captured, the electronic device 101 may generate the captured image for the execution screen of the application to be reduced and displayed in operation 1305. The processor 120 may capture the execution screen of the application displayed on the display 160. The processor 120 may generate a captured image for a main page of the execution screen of the application to be reduced and displayed. The processor 120 may capture the execution screen of the application based on a predefined capture position or a capture position set on the basis of a position where the hovering input is released.

The electronic device 101 may display an object of the application corresponding to the captured image in at least some areas of the display 160 in operation 1307. The processor 120 may set the captured image for the execution screen of the gallery application as the icon 510 of the gallery application and control the display 160 to display the icon 510 in a reference area (e.g., lower right area) of the display 160, as illustrated in FIG. 5A.

When the execution screen of the application cannot be captured, the electronic device 101 may display a basically set icon of the application in at least some areas of the display 160 in operation 1309. The processor 120 may control the display 160 to display an execution screen 1400 of a web browser, as illustrated in FIG. 14A. When the generation of the event for reducing and displaying information on the application is detected, the processor 160 may identify whether a content (e.g., site information) displayed through the web browser can be captured. When the capturing of the web browser is limited, the processor 120 may control the display 160 to display a predefined icon image 1410 of the web browser in a reference area of the display 160, as illustrated in FIG. 14B. The processor 120 may control the display 160 to display the home screen as the background screen of the display 160 since an execution screen of the web browser is reduced and displayed.

Figure 15:
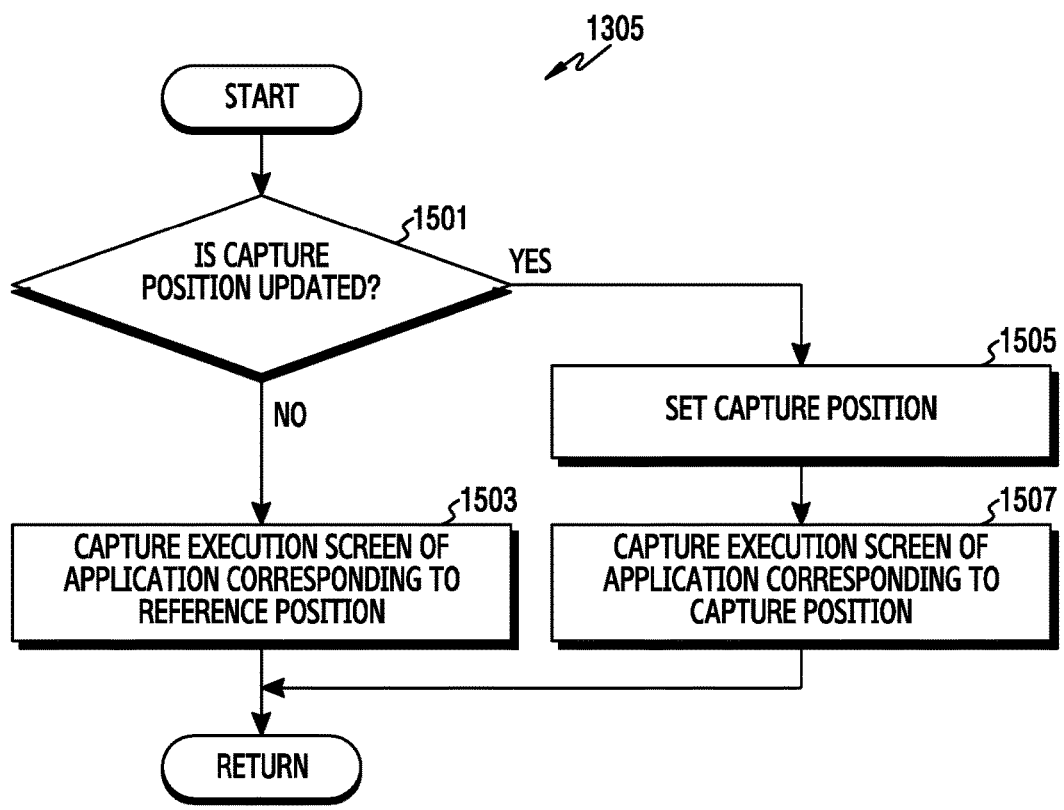
FIG. 15 is a flowchart of a method of changing an image of an application icon in the electronic device, according to an embodiment of the present disclosure.
Figure 16A:
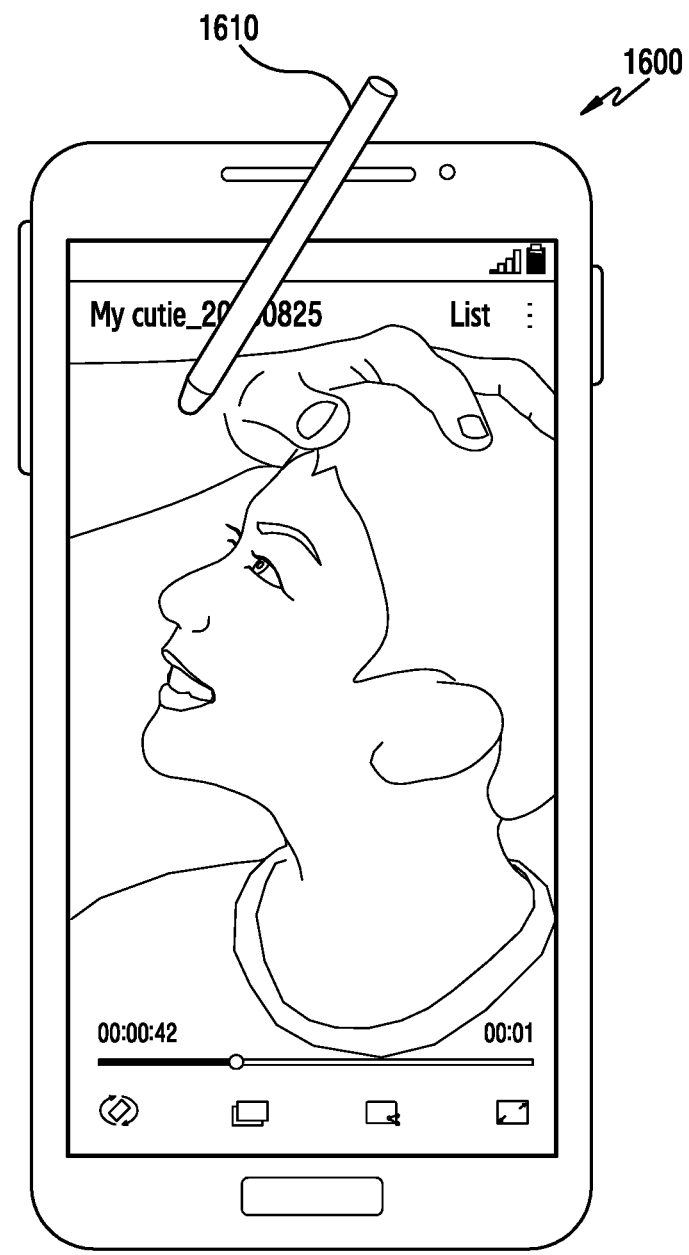
FIGS. 16A and 16B illustrate screen configurations for changing an image of an application icon in the electronic device, according to an embodiment of the present disclosure.
Figure 16B:

FIG. 15 is a flowchart of a method of changing an image of an application icon in the electronic device, according to an embodiment of the present disclosure. FIGS. 16A to 16B illustrate screen configurations for changing the image of the application icon in the electronic device, according to an embodiment of the present disclosure. Hereinafter, a method of capturing the execution screen of the application in operation 1305 of FIG. 13 will be described.

Referring to FIG. 15, when the capturing of the application execution screen is possible (e.g., operation 1303 of FIG. 13), the electronic device 101 may identify whether the capture position can be updated in operation 1501. The processor 120 may determine whether the capture position can be changed based on a time point when information on the application is reduced and displayed and an event type for reducing and displaying the information on the application. When the application is first reduced and displayed, the processor 120 may determine that the capture position cannot be changed. When the information on the application is reduced and displayed by releasing of the hovering input, the processor 120 may determine that the capture position can be changed.

When the capture position cannot be updated, the electronic device 101 may capture the application execution screen corresponding to the reference position in operation 1503. When the capture position cannot be updated, the processor 120 may capture at least a part of the application execution screen based on the center of the application execution screen.

When the capture position can be updated, the electronic device 101 may set the capture position of the application execution screen in operation 1505. When the hovering input 520 for the application icon 510 displayed in the reference area of the display 160 is detected, as illustrated in FIG. 5A, the processor 120 may control the display 160 to display an application execution screen 1600 corresponding to the application icon 510, as illustrated in FIG. 16A. When the hovering input for the application execution screen 1600 is released, the processor 120 may set a capture position based on a position 1610 where the hovering input is released. The processor 120 may set the position 1610 where the hovering input is released as the center of the capture position.

The electronic device 101 may capture the application execution screen corresponding to the capture position in operation 1507. When the capture position is set based on the position 1610 where the hovering input is released, the processor 120 may capture at least a part of the application execution screen based on the capture position, as illustrated in FIG. 16A. Accordingly, the processor 120 may set at least a part of the application execution screen captured based on the capture position as an application icon 1620 and display the application icon 1620 in the reference area of the display 160, as illustrated in FIG. 16B.

Figure 17:
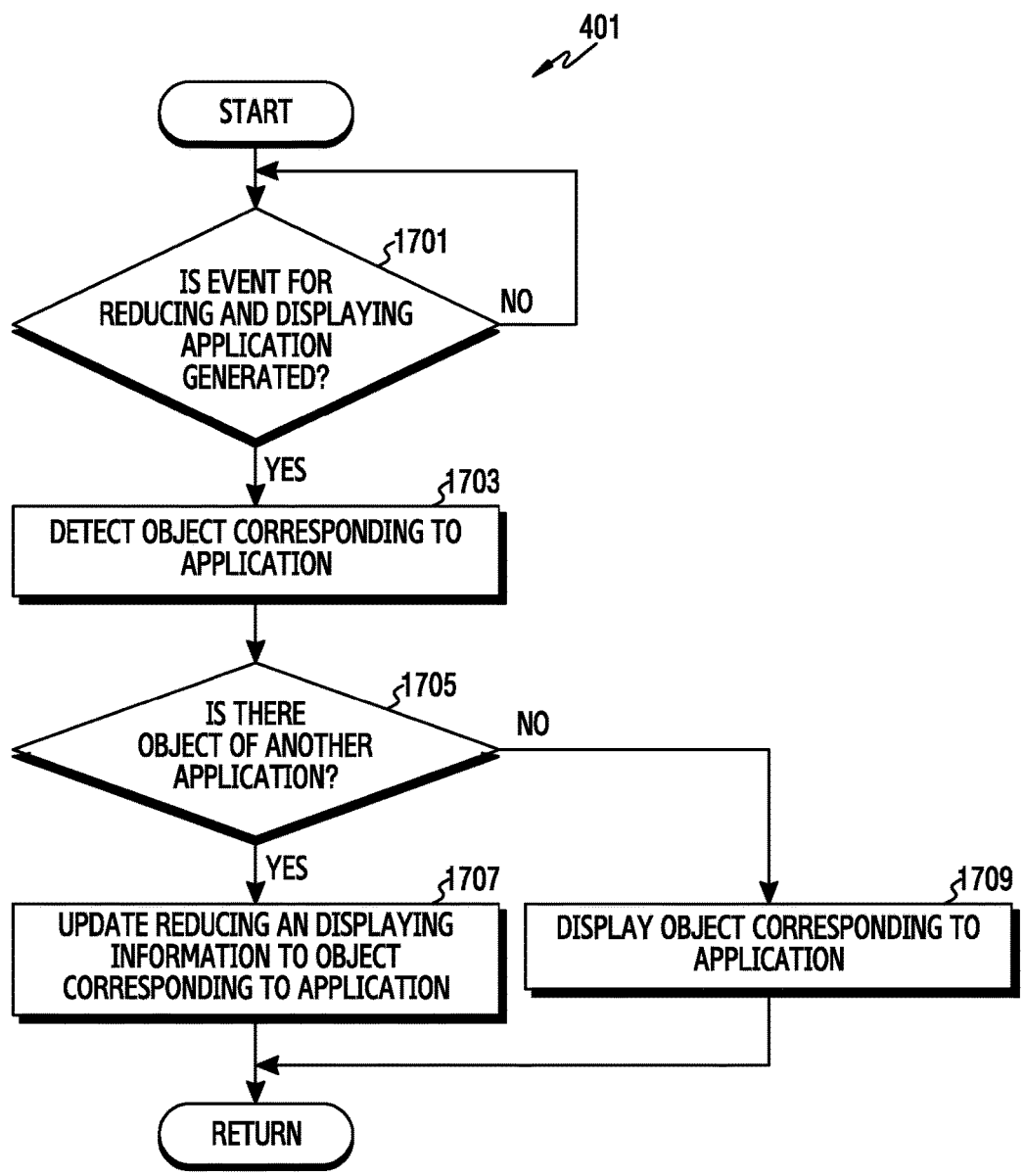
FIG. 17 is a flowchart of a method of updating an application icon in the electronic device, according to an embodiment of the present disclosure.
Figure 18A:
FIGS. 18A and 18B illustrate screen configurations for updating an application icon in the electronic device, according to an embodiment of the present disclosure.
Figure 18B:
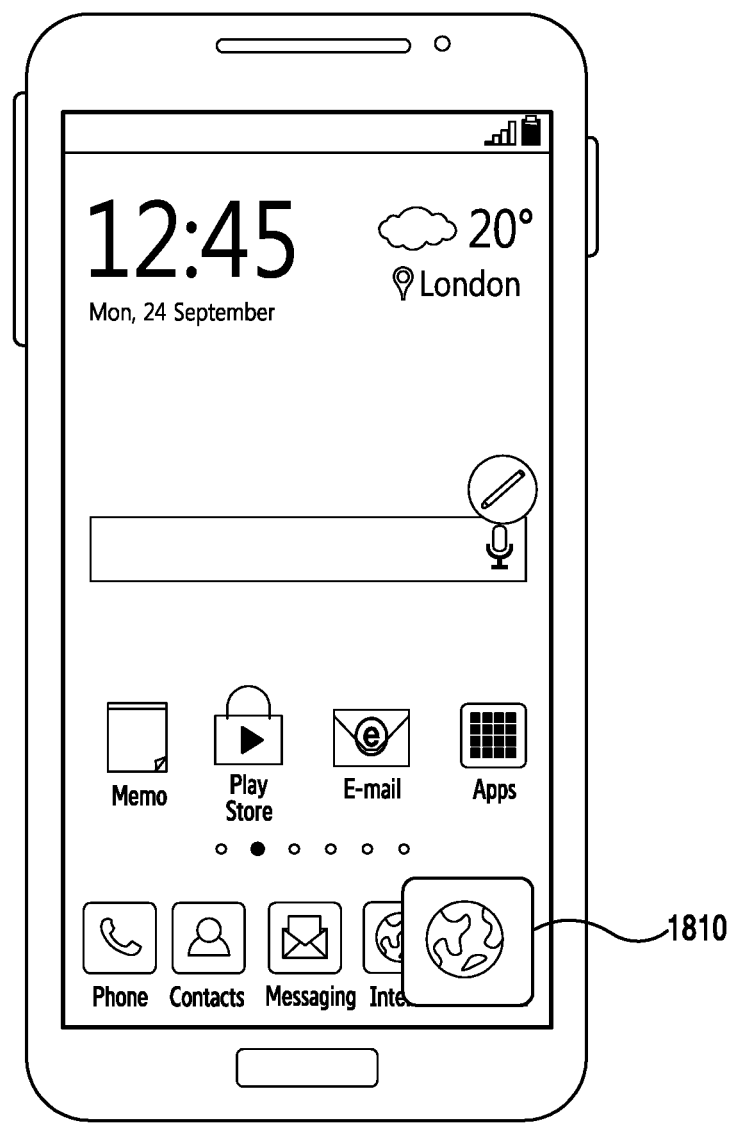

FIG. 17 is a flowchart of a method of updating an application icon in the electronic device, according to an embodiment of the present disclosure. FIGS. 18A and 18B illustrate screen configurations for updating the application icon in the electronic device, according to an embodiment of the present disclosure. Hereinafter, a method of reducing and displaying information on the application in operation 401 of FIG. 4 will be described.

Referring to FIG. 17, the electronic device 101 may identify whether generation of an event for reducing and displaying information on the application is detected in operation 1701. The processor 120 may identify whether generation of an event for reducing and displaying information on the application is detected in a state where an application execution screen is displayed on the display 160, as illustrated in FIG. 12A or 12D.

When the generation of the event for reducing and displaying the information on the application is detected, the electronic device 101 may detect an object (e.g., an icon) corresponding to the application to be reduced and displayed in operation 1703. The processor 120 may set the captured image of the application execution screen as the icon of the application like in operations 1501 to 1507 of FIG. 15. The processor 120 may reduce the execution screen of the application being executed in the electronic device 101 to be a reference size and set the reduced application execution screen as the icon of the application. For example, the processor 120 may detect an icon image predefined for the application.

The electronic device 101 may identify whether there is an object corresponding to another application displayed on the display 160 in operation 1705. The processor 120 may identify whether there is another application previously reduced and displayed in the reference area of the display 160.

When there is the object corresponding to the other application displayed on the display, in operation 1707, the electronic device 101 may change the object corresponding to the other application displayed on the display 160 into the object corresponding to the application detected in operation 1703. The processor 120 may control the display 160 to display an icon of a gallery application in the reference area of the display 160, as illustrated in FIG. 18A based on the generation of the event for reducing and displaying information on the gallery application. The processor 120 may set an execution screen of a web browser as a background screen as the information on the gallery application is reduced and displayed. When an event for reducing and displaying the web browser is generated, the processor 120 may change the icon 1800 of the gallery application displayed in the reference area of the display 160 into an icon 1810 of the web browser, as illustrated in FIG. 18B. The processor 120 may set the home screen as the background screen as the web browser is reduced and displayed.

When there is no object corresponding to the other application displayed on the display, the electronic device 101 may display the object corresponding to the application in areas of the display 160 in operation 1709. The processor 120 may control the display 160 to display the icon 510 of the gallery application in the reference area of the display 160, as illustrated in FIG. 5A.

Figure 19A:
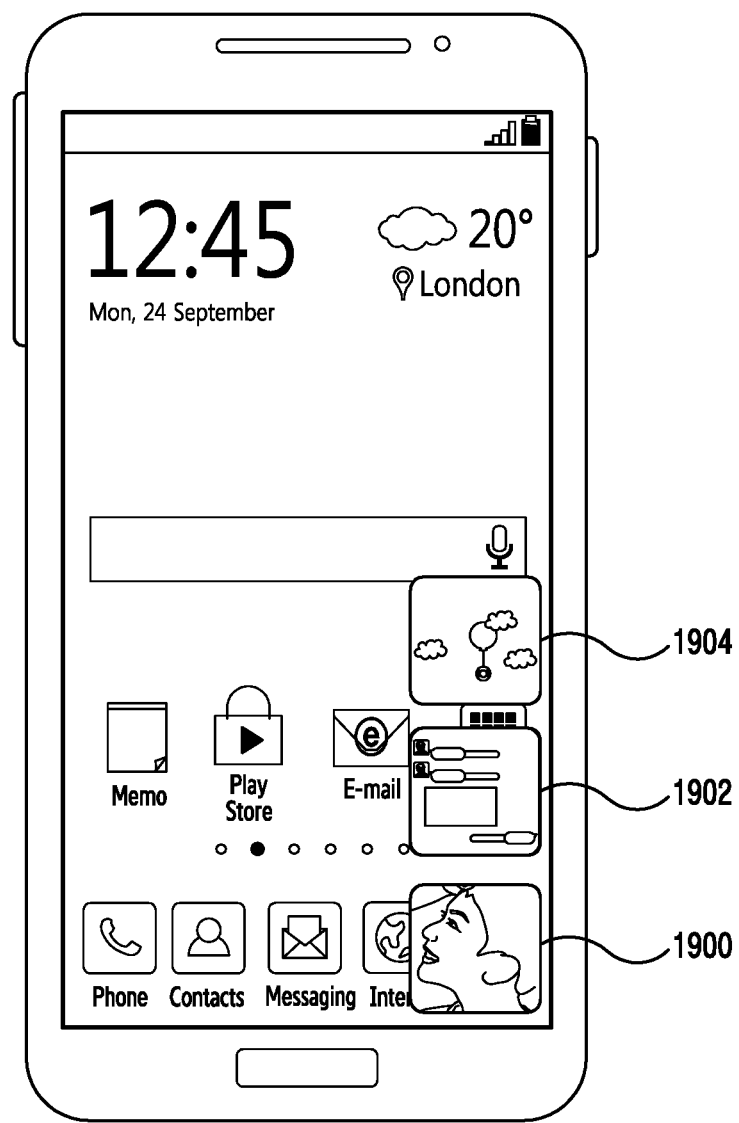
FIGS. 19A and 19B illustrate screen configurations for adding an application icon in the electronic device, according to an embodiment of the present disclosure.
Figure 19B:
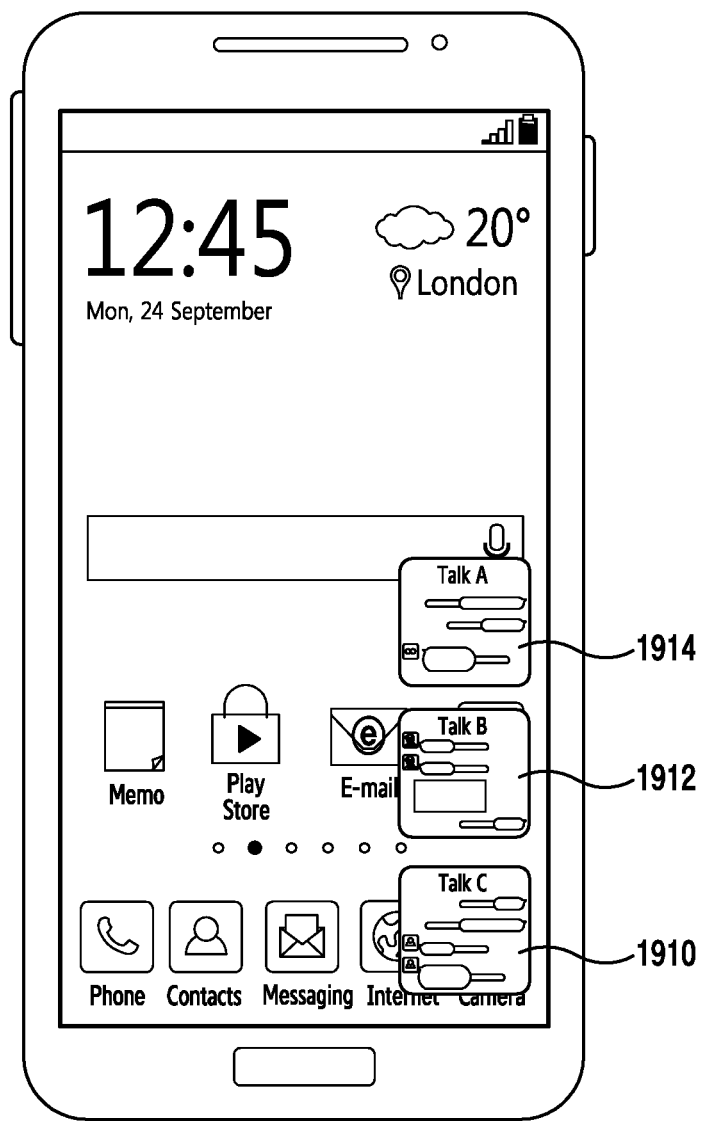

FIGS. 19A and 19B illustrate screen configurations for adding an application icon in the electronic device, according to an embodiment of the present disclosure.

When an event for reducing and displaying a plurality of applications is generated, the electronic device 101 may display an object corresponding to each application areas of the display 160. When an event for reducing and displaying a gallery application is generated, the processor 120 may control the display 160 to display an icon 1900 (e.g., a captured image) of the gallery application in the reference area of the display 160, as illustrated in FIG. 19A. When an event for reducing and displaying a messenger application is additionally generated, the processor 120 may control the display 160 to display an icon 1902 (e.g., a captured image) of the messenger application in the reference area of the display 160. When an event for reducing and displaying a game application is additionally generated, the processor 120 may control the display 160 to display an icon 1904 of the game application in the reference area of the display 160. The processor 120 may control the display 160 to display the icons such that the icon 1900 of the gallery application, the icon 1902 of the messenger application, and the icon 1904 of the game application do not overlap each other. The icon 1904 of the game application may be set as an execution screen of the game being executed in the electronic device 101 which is reduced to a reference size. Accordingly, the processor 120 may control the display 160 to continuously display execution information of the game application through the icon 1904 of the game application.

When an event for reducing and displaying one application is generated many times, the electronic device 101 may display a plurality of objects corresponding to the corresponding application in at least some areas of the display 160. When an event for reducing and displaying a messenger application is generated, the processor 120 may control the display 160 to display an icon 1910 of the messenger application of a first area (e.g., a chat window with counterpart C) in the reference area of the display 160, as illustrated in FIG. 19B. When the event for reducing and displaying the messenger application is additionally generated, the processor 120 may control the display 160 to additionally display an icon 1912 of the messenger application of a second area (e.g., a chat window with counterpart B) in the reference area of the display 160. When the event for reducing and displaying the messenger application is additionally generated, the processor 120 may control the display 160 to additionally display an icon 1914 of the messenger application of a third area (e.g., a chat window with counterpart A) in the reference area of the display 160. The processor 120 may control the display 160 to display the icons such that the icons 1910, 1912, and 1914 of the messenger application do not overlap each other. At least one of the icons 1910, 1912, and 1914 of the messenger application may be set as an execution screen of the messenger being executed in the electronic device 101, which is reduced to a reference size. Accordingly, the processor 120 may continuously display the additionally transmitted and received chat of the messenger through the icons 1910, 1912, and 1914 of the messenger application.

Figure 20:
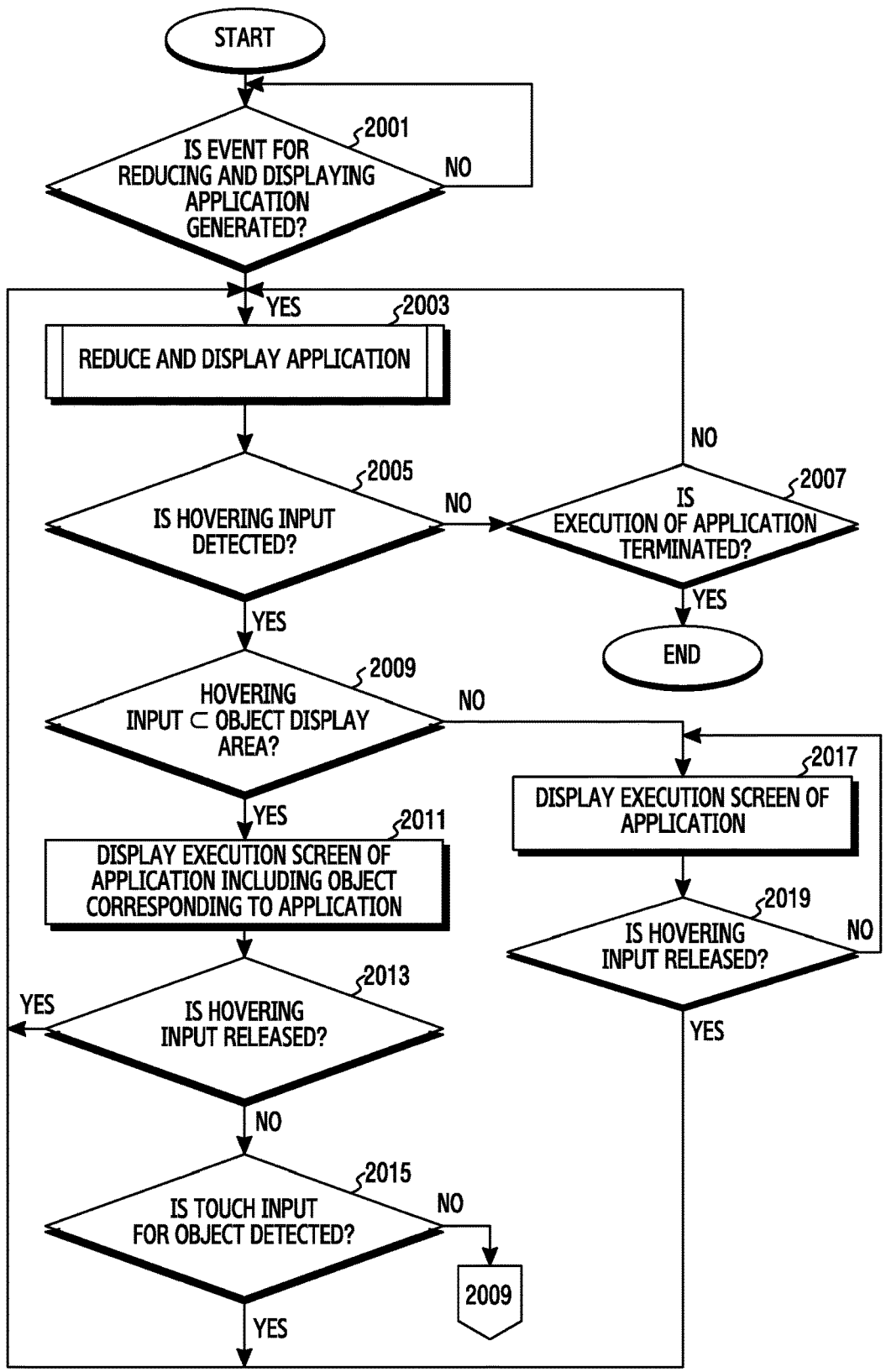
FIG. 20 is a flowchart of a method of switching an application based on a touch input of an application icon in the electronic device, according to an embodiment of the present disclosure.
Figure 21:
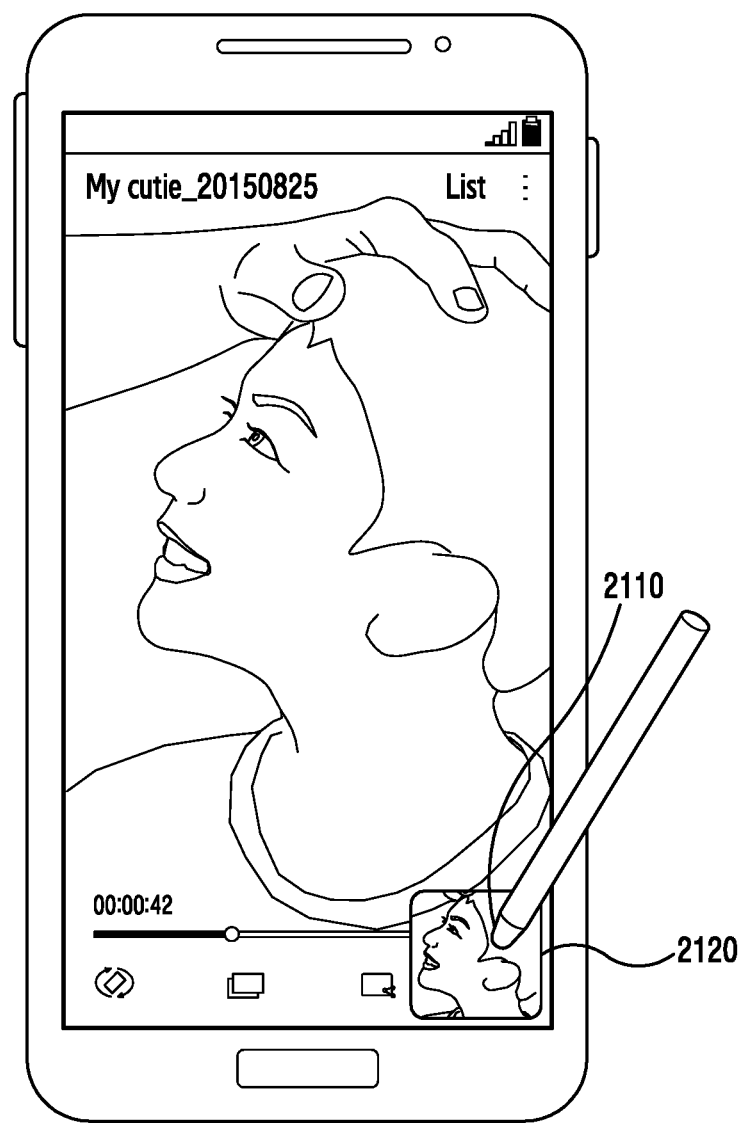
FIG. 21 illustrates a screen configuration for switching an application based on a touch input of an application icon in the electronic device, according to an embodiment of the present disclosure.

FIG. 20 is a flowchart of a method of switching an application based on a touch input of an application icon in the electronic device, according to an embodiment of the present disclosure. FIG. 21 illustrates a screen configuration for switching the application based on the touch input of the application icon in the electronic device, according to an embodiment of the present disclosure.

Referring to FIG. 20, the electronic device 101 may identify whether generation of an event for reducing and displaying information on the application is detected in operation 2001. The processor 120 may identify whether an input of a menu for reducing and displaying information on an application or a gesture input that matches the reducing and displaying of the application is detected. When the input of the menu for reducing and displaying the information on the application or the gesture input that matches the reducing and displaying of the application is detected, the processor 120 may determine that the event for reducing and displaying the information on the application is generated.

When generation of the event for reducing and displaying the information on the application is detected, the electronic device 101 may display an object corresponding to the information on the application in the reference area of the display in operation 2003. The processor 120 may reduce an execution screen of the application to be the object (icon) corresponding to the application and control the display 160 to display the object (icon) like in operations 1001 to 1009 of FIG. 10. The processor 120 may control the display 160 to display the object (icon) corresponding to the application to be reduced and displayed like in operations 1101 to 1111 of FIG. 11. The reference area may include a display area (e.g., a lower right area) defined in the displayed or an area where the icon of the application is previously displayed.

The electronic device 101 may identify whether a hovering input for the application information reduced and displayed in the reference area of the display is detected in operation 2005. When the hovering input is detected, the processor 120 may identify whether a hovering position is located within the display area of the object corresponding to the application.

When the hovering input for the application information reduced and displayed on the display is not detected, the electronic device 101 may identify whether execution of the reduced and displayed application is terminated in operation 2007. When the application icon displayed in the reference area of the display 160 is deleted, the processor 120 may determine whether the execution of the corresponding application is terminated. When the application icon is displayed in the reference area of the display 160, the processor 120 may execute the application corresponding to the application icon in the background. When the application being executed in the background is terminated, the processor 120 may determine that the execution of the application corresponding to the application icon is terminated.

When the execution of the reduced and displayed application is maintained, the electronic device 101 may maintain the reducing and displaying of the application information in operation 2003.

When the hovering input for the application information reduced and displayed on the display is detected, the electronic device 101 may identify whether the hovering input is within an area where the application information is reduced and displayed on the display 160 in operation 2009. The processor 120 may identify whether the hovering input detected in operation 2005 is maintained within the display area of the object corresponding to the application.

When the hovering input is within the area where the application information is reduced and displayed, the electronic device 101 may display an execution screen of the application including an application icon on the display in operation 2011. When a hovering input 2110 for an application icon 2120 is detected, the processor 120 may control the display 160 to display an execution screen of the application corresponding to the application icon 2120 in areas of the display 160. When a hovering input 2110 is maintained within a display area of the application icon 2120, the processor 120 may control the display 160 to maintain the displaying of the application icon 2120, as illustrated in FIG. 21.

The electronic device 101 may identify whether the hovering input for the application is released in a state where the execution of the application is displayed in operation 2013. When the hovering input is not detected for a reference time, the processor 120 may determine that the hovering input for the application is released. The reference time may be set based on time spent for selecting a control button (e.g., a back button) disposed outside the touch screen to control the application execution screen.

When the hovering input for the application is released, the electronic device 101 may reduce and display the information on the application in the reference area of the display 160 in operation 2003. The processor 120 may capture the execution screen of the application based on a position where the hovering input is released and set the capture execution screen as the application icon. The processor 120 may reduce the execution screen of the application to be the application icon and control the display 160 to display the application icon in an area of the display 160.

When the hovering input for the application is maintained, the electronic device 101 may identify whether a touch input for the object corresponding to the application is detected in operation 2015. For example, the processor 120 may identify whether the touch input for the application icon 2120 is detected in a state where the application execution screen and the application icon 2120 are displayed, as illustrated in FIG. 21.

When the touch input for the object corresponding to the application is detected, the electronic device 101 may reduce and display the information on the application in the reference area of the display 160 in operation 2003. When the application is reduced based on the touch input for the application icon, the processor 120 may control the display 160 to display the deletion icon 600 for deleting the application icon 602 in an area of the display 160, as illustrated in FIG. 6A.

When the touch input for the object corresponding to the application is not detected, the electronic device 101 may identify whether the hovering input is within the area where the application information is reduced and displayed in operation 2009.

When the hovering input is not within the area where the application information is reduced and displayed, the electronic device 101 may display the execution screen of the application in all or at least some areas of the display in operation 2017. When the hovering input for the application is maintained but the hovering position escapes from the display area of the object corresponding to the application, the processor 120 may control the display 160 to enlarge and display the execution screen of the corresponding application. The processor 120 may control the display 160 to display the execution screen of the application, which does not include reducing and displaying information (e.g., object) of the application, on the display 160, as illustrated in FIG. 5B or 5C.

The electronic device 101 may identify whether the hovering input for the application is released in a state where the execution of the application is displayed in operation 2019.

When the hovering input for the application is released, the electronic device 101 may reduce and display the information on the application in the reference area of the display 160 in operation 2003.

When the hovering input for the application is maintained, the electronic device 101 may maintain the displaying of the application execution screen in operation 2017.

Figure 22:
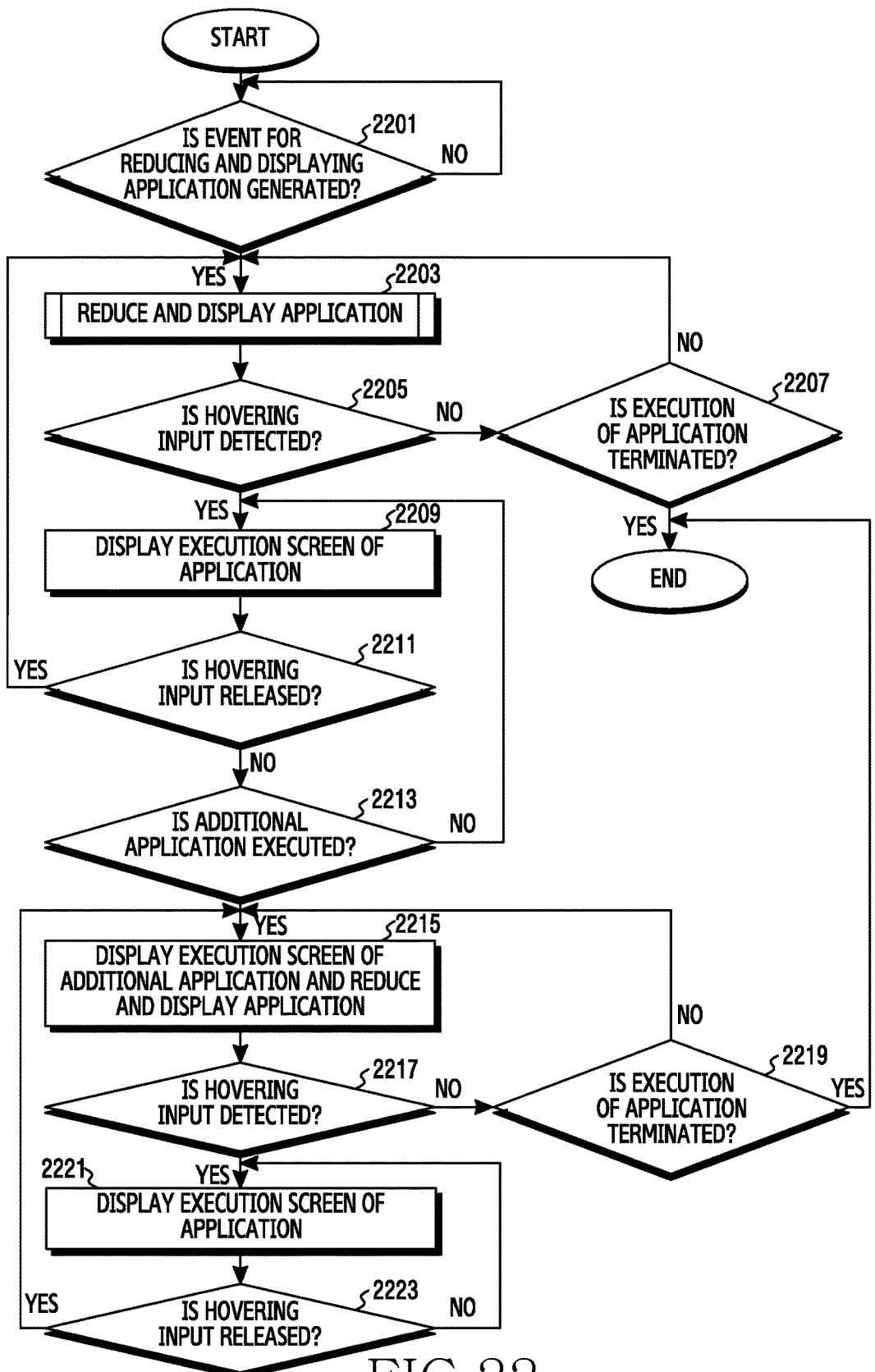
FIG. 22 is a flowchart of a method of executing an additional application in the electronic device, according to an embodiment of the present disclosure.
Figure 23A:
FIGS. 23A and 23B illustrate screen configurations for executing an additional application in the electronic device, according to an embodiment of the present disclosure.
Figure 23B:

FIG. 22 is a flowchart of a method of executing an additional application in the electronic device, according to an embodiment of the present disclosure. FIGS. 23A and 23B illustrate screen configurations for execution the additional application in the electronic device, according to an embodiment of the present disclosure.

Referring to FIG. 22, the electronic device 101 may identify whether generation of an event for reducing and displaying information on an application is detected in operation 2201. When an input of a menu for reducing and displaying information on the application is detected, the processor 120 may determine whether the event for reducing and displaying the information on the application is generated. When a gesture input that matches the reducing and displaying of the application is detected, the processor 120 may determine that the event for reducing and displaying the information on the application is generated.

When the generation of the event for reducing and displaying the information on the application is detected, the electronic device 101 may reduce and display the information on the application in the reference area of the display 160 in operation 2203. The processor 120 may control the display 160 to display an object corresponding to the application to be reduced and displayed in the reference area of the display 160 like in operations 1001 to 1009 of FIG. 10 or operations 1101 to 1111 of FIG. 11.

The electronic device 101 may identify whether a hovering input for the application information reduced and displayed in the reference area of the display 160 is detected in operation 2205. The processor 120 may identify whether a hovering input for a display area of the object corresponding to the application displayed in the reference area of the display 160 is detected.

When the hovering input for the application information reduced and displayed on the display is not detected, the electronic device 101 may identify whether execution of the reduced and displayed application is terminated in operation 2207. When the application icon displayed in the reference area of the display 160 is deleted or when the application being executed in the background is terminated, the processor 120 may determine that the execution of the corresponding application is terminated.

When the execution of the reduced and displayed application is maintained, the electronic device 101 may maintain the reducing and displaying of the application information in operation 2203.

When the hovering input for the application information reduced and displayed on the display 160 is detected, the electronic device 101 may display an execution screen of the application in all or at least some areas of the display in operation 2209. When the hovering input for the object corresponding to the application displayed on the display 160 is detected, the processor 120 may control the display 160 to enlarge and display an execution screen 2300 of the application, as illustrated in FIG. 23A. The application execution screen 2300 may include connection information 2310 on a connection to another application.

The electronic device 101 may identify whether the hovering input for the application is released in a state where the execution of the application is displayed in operation 2211. For example, the processor 120 may identify whether the hovering input is not detected for a reference time. When the hovering input is not detected for the reference time, the processor 120 may determine that the hovering input for the application is released. When the hovering input for the electronic device 101 is not detected, the processor 120 may determine that the hovering input for the application is released.

When the hovering input for the application is released, the electronic device 101 may reduce and display the information on the application in the reference area of the display 160 in operation 2203. The processor 120 may control the display 160 to display an application icon set by capturing an execution screen of the application based on a position where the hovering input is released in the reference area of the display 160.

When the hovering input for the application is maintained, the electronic device 101 may identify whether an additional application is executed in operation 2213. The processor 120 may identify whether a selection input 2320 for the connection information 2310 on the connection to the other application included in the application execution screen 2300, as illustrated in FIG. 23A. When the selection input 2320 of the connection information 2310 on the connection to the other application is detected, the processor 120 may determine that the additional information is executed.

When the additional application is not executed, the electronic device 101 may maintain the displaying of the application execution screen in operation 2209.

When the additional application is executed, the electronic device operation may display an execution screen of the additional application and an object corresponding to the application in operation 2215. When the selection input 2320 for the connection information 2310 on the connection to the other application included in the application execution screen 2300 is detected, as illustrated in FIG. 23A, the processor 120 may control the display 160 to display an execution screen 2330 of the other application on the display 160, as illustrated in FIG. 23B. In addition, the processor 120 may control the display 160 to display an application icon 2332 corresponding to the application execution screen 2300 in the reference area of the display 160. The processor 120 may control transparency of the application icon 2332 so that the user can recognize information on some areas of the execution screen 2330 of the other application that overlaps the application icons 2332.

The electronic device 101 may identify whether a hovering input for application information reduced and displayed on the display 160 is detected in operation 2217. The processor 120 may identify whether the hovering input for the application icon 2332 displayed on the display 160 is detected, as illustrated in FIG. 23B.

When the hovering input for the application information reduced and displayed on the display is not detected, the electronic device may identify whether execution of the reduced and displayed application is terminated in operation 2219.

When the execution of the reduced and displayed application is maintained, the electronic device 101 may maintain the displaying of the execution screen of the additional application and the application icon in operation 2215. The processor 120 may provide a service corresponding to the touch input or the hovering input for the execution screen of the additional application.

When the hovering input for the application information reduced and displayed on the display 160 is detected, the electronic device 101 may display the execution screen of the application on the display in operation 2221. When the hovering input for the application icon 2332 displayed on the display 160 is detected, as illustrated in FIG. 23B, the processor 120 may control the display 160 to display the execution screen 2300 of the application on the display 160, as illustrated in FIG. 23A.

The electronic device 101 may identify whether the hovering input for the application is released in a state where the execution of the application is displayed in operation 2223.

When the hovering input for the application is released, the electronic device 101 may reduce and display the information on the application in the reference area of the display 160 in operation 2215. The electronic device 101 may display the execution screen of the additional application as the background screen.

When the hovering input for the application is maintained, the electronic device 101 may maintain displaying of the execution screen of the application in operation 2221. The processor 120 may provide a service corresponding to the touch input or the hovering input of the execution screen of the application.

Figure 24:
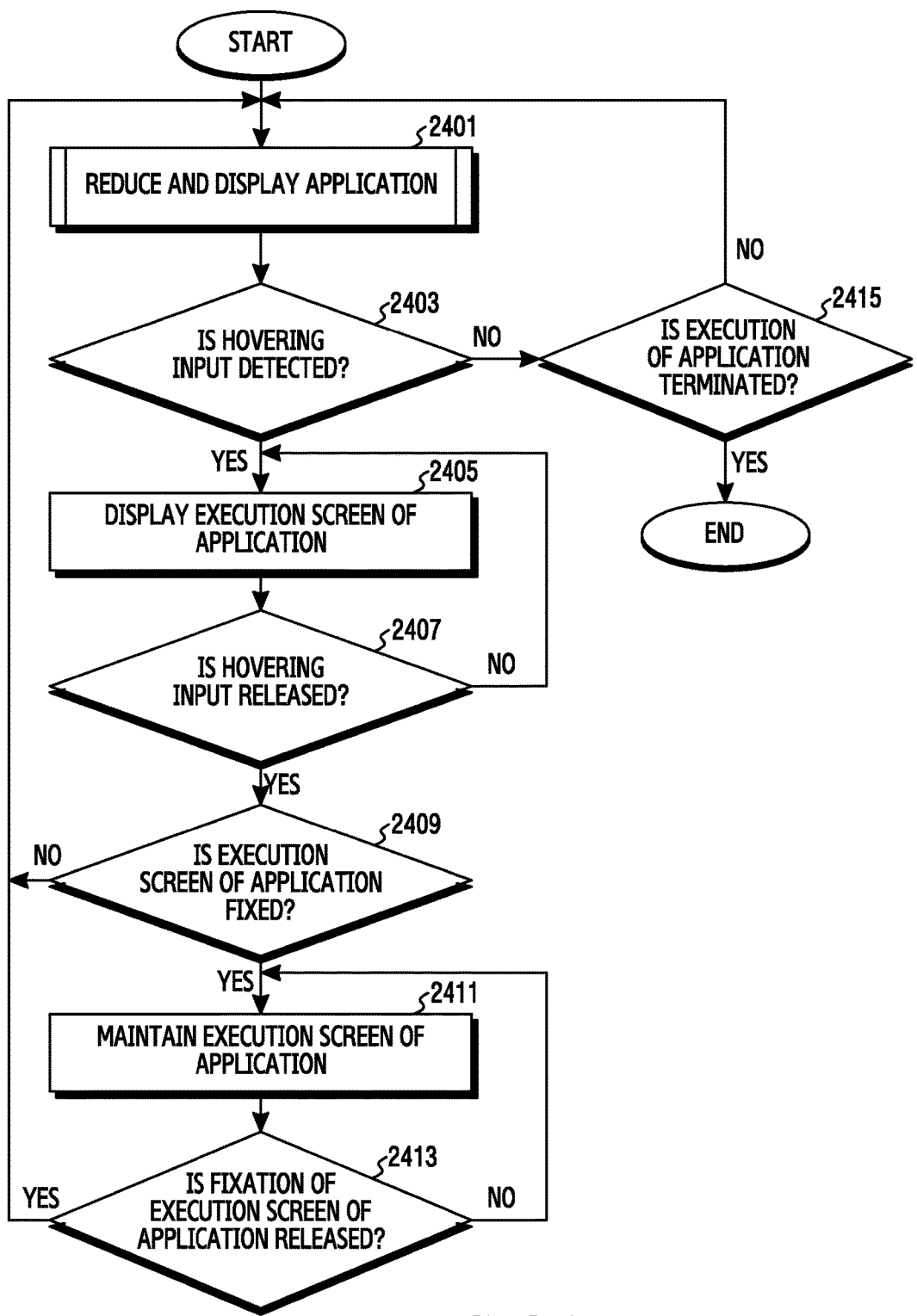
FIG. 24 is a flowchart of a method of limiting an application switch in the electronic device, according to an embodiment of the present disclosure.
Figure 25A:
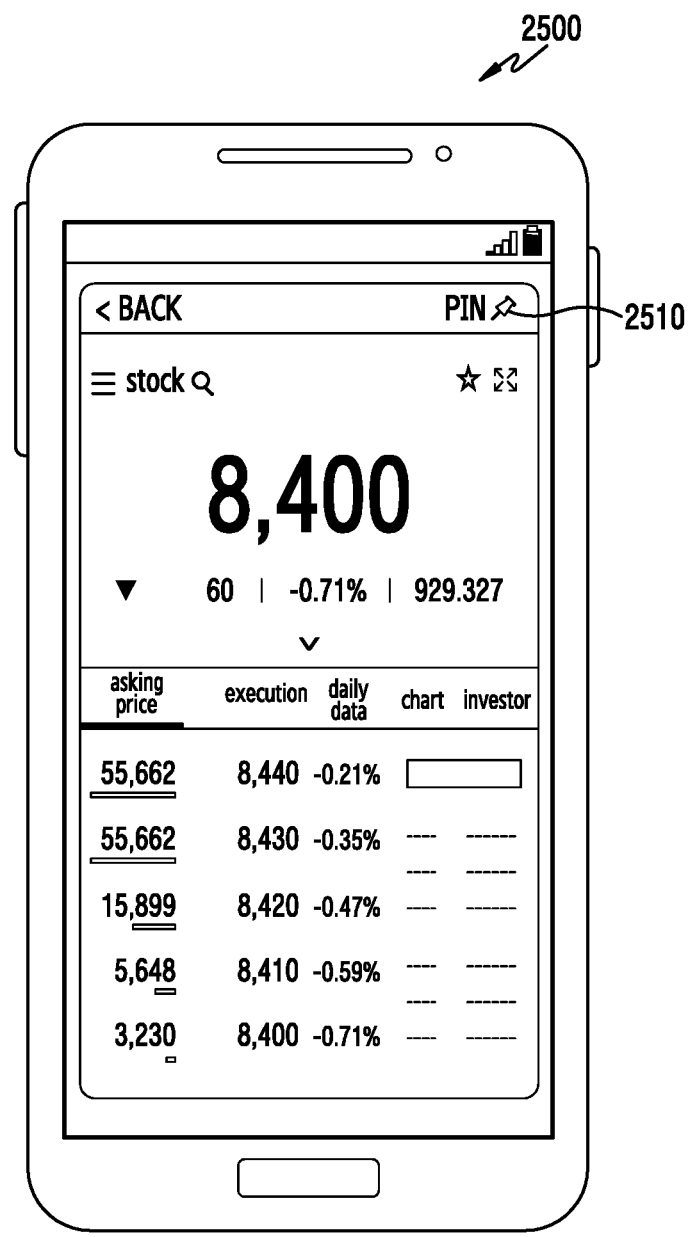
FIGS. 25A and 25B illustrate screen configurations for limiting an application switch in the electronic device, according to an embodiment of the present disclosure.
Figure 25B:
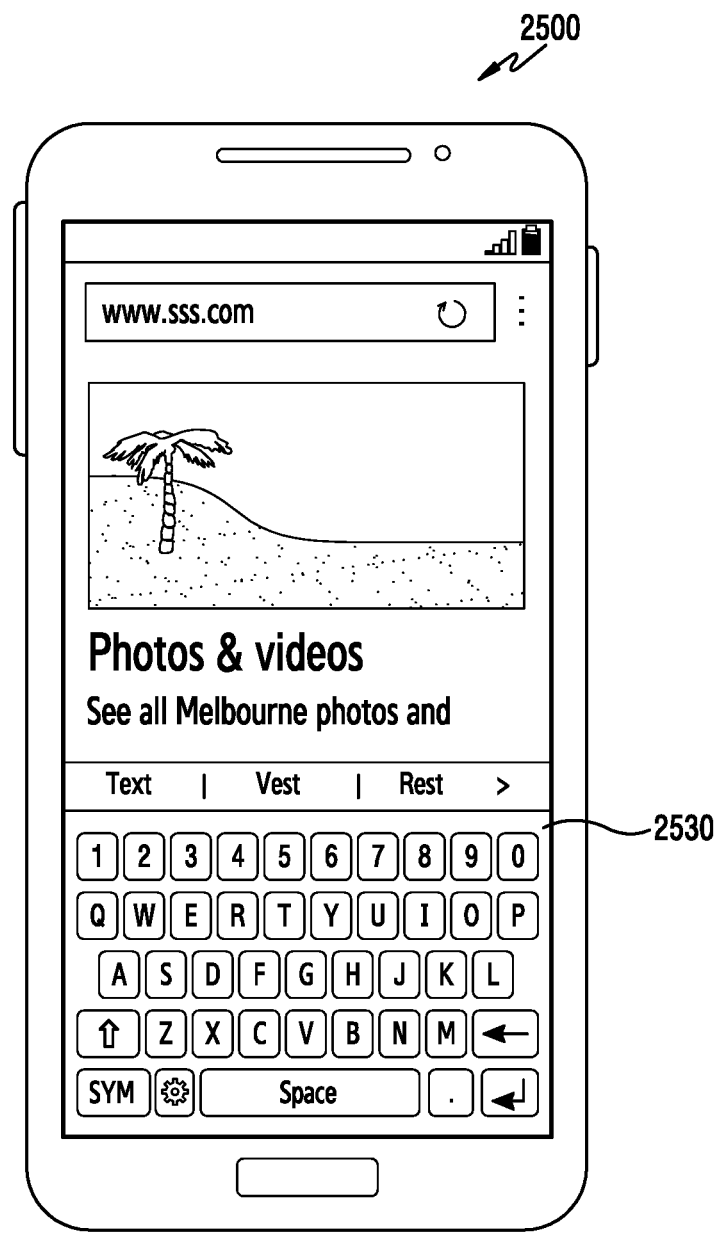

FIG. 24 is a flowchart of a method for limiting a switching of an application in the electronic device, according to an embodiment of the present disclosure. FIGS. 25A and 25B illustrate screen configurations for limiting the switching of the application in the electronic device, according to an embodiment of the present disclosure.

Referring to FIG. 24, the electronic device 101 may reduce and display application information in the reference area of the display 160 in operation 2401. When generation of an event for reducing and displaying the application is detected, the processor 120 may control the display 160 to display an object corresponding to the application in the reference area of the display 160 like in operations 1001 to 1009 of FIG. 10 or operations 1101 to 1111 of FIG. 11.

The electronic device 101 may identify whether a hovering input for the application information reduced and displayed in the reference area of the display is detected in operation 2403. The processor 120 may identify whether the hovering input detected through the display 160 enters a display area of the object corresponding to the application displayed on the display 160. When the hovering input detected through the display 160 enters a display area of the object corresponding to the application, the processor 120 may determine that the hovering input for application information is detected.

When the hovering input for application information reduced and displayed on the display is detected, the electronic device 101 may enlarge and display a reduced and displayed execution screen of the application on the display 160 in operation 2405. When the hovering input for the object corresponding to the application is detected, the processor 120 may control the display 160 to display the execution screen of the application corresponding to an application icon in all or at least some areas of the display 160.

The electronic device 101 may identify whether the hovering input for the application is released in operation 2407. When the hovering input is not detected for a reference time for an input of a control button for controlling the application execution screen, the processor 120 may determine that the hovering input for the application is released.

When the hovering input for the application is maintained, the electronic device 101 may maintain displaying of the execution screen of the application in operation 2405.

When the hovering input for the application is released, the electronic device 101 may identify whether the application execution screen is fixed in operation 2409. The processor 120 may identify whether a fixed menu of the application execution screen is set. The processor 120 may identify whether the application execution screen is fixed based on input attributes of the application execution screen. The input attributes of the application execution screen may include an available input type to receive a service through the application execution screen.

When the application execution screen is not fixed, the electronic device 101 may reduce the application execution screen to be an application icon and display the application icon in the reference area of the display in operation 2401.

When the application execution screen is fixed, the electronic device 101 may maintain the displaying of the application execution screen in operation 2411. When the hovering input for the application icon is detected, the processor 120 may control the display 160 to display an execution screen 2500 of a stock application, as illustrated in FIG. 25A. When a fixed menu (e.g., fixed icon) 2510 for the execution screen 2500 of the stock application is activated, the processor 120 may control the display 160 to maintain the displaying of the execution screen 2500 of the stock application regardless of whether the hovering input is released. When a virtual keypad 2530 is displayed on an execution screen 2520 of a web browser, the processor 120 may determine that text is input through the virtual keypad 2530, as illustrated in FIG. 25B. Accordingly, the processor 120 may control the display 160 to maintain the displaying of the execution screen 2520 of the web browser to input the text regardless of whether the hovering input is released.

The electronic device 101 may identify whether the fixing of the application execution screen is released in operation 2413. When the fixed menu (e.g., fixed icon) 2510 for the execution screen 2500 of the stock application is deactivated in FIG. 25A, the processor 120 may determine that the fixing of the application execution screen is released. When the displaying of the virtual keypad 2530 is released or when the input of text using the virtual keypad 2530 is completed in FIG. 25B, the processor 120 may determine that the fixing of the application execution screen is released. When an instruction such as searching for, transmitting, or switching the text input through the virtual keypad 2530 is input, the processor 120 may determine that the text input using the virtual keypad 2530 is completed.

When the setting for the fixing of the application execution screen is maintained, the electronic device 101 may maintain the enlarged displaying of the application execution screen in operation 2411.

When the fixing of the application execution screen is released, the electronic device 101 may reduce the application execution screen to be an object corresponding to the application and display the object in the reference area of the display 160 in operation 2401.

When the hovering input for application information reduced and displayed in the reference area of the display 160 is not detected, the electronic device 101 may identify whether the execution of the reduced and displayed application is terminated in operation 2415. The processor 120 may identify whether the application icon displayed on the display 160 is deleted or whether the execution of the application being executed in the background is terminated.

When the execution of the reduced and displayed application is maintained, the electronic device 101 may maintain the reduced displaying of the application in operation 2401.

An electronic device 101 and a method of operating the same ac may easily switch an application executed in the at a time point when a user of the electronic device 101 desires by displaying an execution screen of the corresponding application while a hovering event corresponding to reduced and displayed application information is received (e.g., while a hovering input is maintained).

At least some of devices (e.g., modules or functions thereof) or methods (e.g., operations) may be implemented by an instruction which is stored in a non-transitory computer-readable storage medium (e.g., the memory 130) in the form of a program module. The instruction, when executed by a processor (e.g., the processor 120), may cause one or more processors to execute the function corresponding to the instruction. The computer-readable storage medium may include a hard disk, a floppy disk, a magnetic medium (e.g., a magnetic tape), an optical media (e.g., CD-ROM, DVD), a magneto-optical media (e.g., a floptical disk), an inner memory, etc. The instruction may include a code made by a complier or a code that can be executed by an interpreter. The programming module may include one or more of the aforementioned elements or may further include other additional elements, or some of the aforementioned elements may be omitted.

Operations performed by a module, a programming module, or other elements according to various embodiments may be executed sequentially, in parallel, repeatedly, or in a heuristic manner. At least some operations may be executed according to another sequence, may be omitted, or may further include other operations.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device, comprising:
    a display; and
    at least one processor that is configured to:
        control the display to display an execution screen of an application,
        control the display to display a reduced size object corresponding to the application based on a reducing event generated for the execution screen,
        control the display to display the execution screen of the application in an area of the display if a hovering input is detected on the reduced size object corresponding to the application, and
        control the display to display the reduced size object corresponding to the application if the hovering input is released.

2. The electronic device of claim 1, wherein the at least one processor is further configured to set one of a captured image of the execution screen of the application and an icon image of the application as the reduced size object corresponding to the application.

3. An electronic device, comprising:
    a display; and
    at least one processor that is configured to:
        control the display to display an object corresponding to an application,
        control the display to display an execution screen of the application in an area of the display if a hovering input is detected on the object corresponding to the application, and
        control the display to display the object corresponding to the application if the hovering input is released,
    wherein, if an object corresponding to another application is displayed on the display, the at least one processor is further configured to change the object corresponding to the other application into the object corresponding to the application.

4. The electronic device of claim 1, wherein, if a reduced size object corresponding to another application is displayed on the display, the at least one processor is further configured to control the display to display the reduced size object corresponding to the application so as not to overlap the reduced size object corresponding to the other application.

5. The electronic device of claim 1, wherein, if a touch input for the reduced size object corresponding to the application displayed on the display is detected, the at least one processor is further configured to control the display to display a deletion icon.

6. The electronic device of claim 1, wherein, if another application is executed through the execution screen of the application, the at least one processor is further configured to control the display to display an execution screen of the other application and the reduced size object corresponding to the application.

7. An electronic device, comprising:
    a display; and
    at least one processor that is configured to:
        control the display to display an object corresponding to an application,
        control the display to display an execution screen of the application in an area of the display if a hovering input is detected on the object corresponding to the application, and
        control the display to di play the object corresponding to the application if the hovering input is released,
    wherein, if the hovering input is released, the at least one processor is further configured to capture the execution screen of the application based on a position where the hovering input is released, set a captured image of the execution screen of the application as the reduced size object corresponding to the application, and control the display to display the reduced size object corresponding to the application on the display.

8. The electronic device of claim 1, wherein, if the hovering input corresponding to the execution screen of the application is not detected within a reference time frame, the at least one processor is further configured to determine that the hovering input is released.

9. The electronic device of claim 1, wherein, if a fixed menu for the execution screen of the application is set, the at least one processor is further configured to maintain the execution screen in at least a part of the display, regardless of whether the hovering input is released.

10. A method of operating an electronic device, the method comprising:
    displaying an execution screen of an application on a display of the electronic device;
    displaying a reduced size object corresponding to the application on a display based on a reducing event generated for the execution screen;
    if a hovering input is detected on the reduced size object corresponding to the application, displaying the execution screen of the application in an area of the display; and
    if the hovering input is released, displaying the reduced size object corresponding to the application on the display.

11. The method of claim 10, wherein the reduced size object corresponding to the application includes one of a captured image of the execution screen of the application and an icon image of the application.

12. A method of operating an electronic device, the method comprising:
    displaying an object corresponding to an application on a display of the electronic device;
    if a hovering input is detected on the object corresponding to the application, displaying an execution screen of the application in an area of the display; and
    if the hovering input is released, displaying the object corresponding to the application on the display,
    wherein displaying the object corresponding to the application comprises, if an object corresponding to another application is displayed on the display, changing the object corresponding to the other application into the object corresponding to the application.

13. The method of claim 10, wherein displaying the reduced size object corresponding to the application comprises, if a reduced size object corresponding to another application is displayed on the display, displaying the reduced size object corresponding to the application so as not to overlap the reduced size object corresponding to the other application.

14. The method of claim 10, further comprising, if a touch input for the reduced size object corresponding to the application displayed on the display is detected, displaying a deletion icon on the display.

15. The method of claim 10, further comprising, if another application is executed through the execution screen of the application, displaying an execution screen of the other application and the reduced size object corresponding to the application.

16. A method of operating an electronic device, the method comprising:
- displaying an object corresponding to an application on a display of the electronic device;
- if a hovering input is detected on the object corresponding to the application, displaying an execution screen of the application in an area of the display; and
- if the hovering input is released, displaying the object corresponding to the application on the display,
- wherein displaying the object corresponding to the application on the display comprises:
  - if the hovering input is released, capturing the execution screen of the application based on a position where the hovering input is released;
  - setting a captured image of the execution screen of the application as the object corresponding to the application; and
  - displaying the object corresponding to the application on the display.

17. The method of claim 10, wherein displaying the reduced size object corresponding to the application on the display comprises, if the hovering input corresponding to the execution screen of the application is not detected for a reference time frame, displaying the reduced size object corresponding to the application on the display.

18. The method of claim 10, further comprising, if a fixed menu for the execution screen of the application is set, maintaining the execution screen of the application displayed in at least a part of the display, regardless of whether the hovering input is released.

* * * * *